US012418627B2

(12) United States Patent
Agrawal et al.

(10) Patent No.: US 12,418,627 B2
(45) Date of Patent: Sep. 16, 2025

(54) FREEZE FRAME VIDEO PRESENTATION FOR SELECT PARTICIPANTS DURING A VIDEO COMMUNICATION SESSION

(71) Applicant: MOTOROLA MOBILITY LLC, Wilmington, DE (US)

(72) Inventors: Amit Kumar Agrawal, Bangalore (IN); Jeffrey T Snow, Barrington, IL (US); Olivier D Meirhaeghe, Lincolnshire, IL (US); Bill Ryan, Libertyville, IL (US)

(73) Assignee: Motorola Mobility LLC, Chicago, IL (US)

( * ) Notice: Subject to any disclaimer, the term of this patent is extended or adjusted under 35 U.S.C. 154(b) by 429 days.

(21) Appl. No.: 17/935,959

(22) Filed: Sep. 28, 2022

(65) Prior Publication Data

US 2024/0106980 A1 Mar. 28, 2024

(51) Int. Cl.
*H04N 7/15* (2006.01)
*G06F 3/14* (2006.01)
*G06V 40/16* (2022.01)
*G06V 40/20* (2022.01)
*H04L 12/18* (2006.01)
*H04N 7/14* (2006.01)

(52) U.S. Cl.
CPC .............. *H04N 7/152* (2013.01); *G06F 3/14* (2013.01); *G06V 40/176* (2022.01); *G06V 40/20* (2022.01); *H04L 12/1822* (2013.01); *H04N 7/147* (2013.01)

(58) Field of Classification Search
None
See application file for complete search history.

(56) References Cited

U.S. PATENT DOCUMENTS

| | | | | |
|---|---|---|---|---|
| 11,082,661 | B1* | 8/2021 | Pollefeys | H04N 7/15 |
| 11,190,726 | B1* | 11/2021 | Oulès | H04N 5/76 |
| 11,290,680 | B1* | 3/2022 | Bright-Thomas | H04L 65/80 |
| 2008/0297589 | A1 | 12/2008 | Kurtz | |
| 2015/0130952 | A1* | 5/2015 | Wang | H04N 19/44 348/192 |
| 2016/0127710 | A1* | 5/2016 | Saban | G11B 27/005 386/241 |
| 2016/0337705 | A1* | 11/2016 | Jones | H04N 21/234381 |
| 2022/0129668 | A1* | 4/2022 | Reed | H04N 7/147 |

* cited by examiner

*Primary Examiner* — Duc Nguyen
*Assistant Examiner* — Assad Mohammed
(74) *Attorney, Agent, or Firm* — Isidore PLLC

(57) ABSTRACT

An electronic device, a method, and a computer program product provides freeze frame videos in place of a live video feed or a low-quality video feed to a video communication session. The electronic device hosts the video communication session between a first participant device and second participant devices. The electronic device receives, from the first participant device, a first video feed of a first participant to the video communication session. The electronic device determines a video segment of the received first video feed to identify as the first freeze frame video, generates the first freeze frame video from the video segment, and stores the first freeze frame video within a server repository. In response to a trigger condition, the electronic device temporarily presents to the video communication session the first freeze frame video in place of the first video feed as video content from the first participant device.

20 Claims, 13 Drawing Sheets

FREEZE FRAME VIDEO PRESENTATION FOR SELECT PARTICIPANTS DURING A VIDEO COMMUNICATION SESSION

CROSS REFERENCE TO RELATED APPLICATION

This application is related to application Ser. No. 17/935,955, filed on an even date herewith, the content of which is fully incorporated herein by reference.

BACKGROUND

1. Technical Field

The present disclosure generally relates to electronic devices that capture video provided to a video communication session, and more specifically to electronic devices responding to situations that affect the capturing and transmitting of video to a video communication session.

2. Description of the Related Art

Modern smartphones are equipped with integrated digital cameras (or image capturing sensors/devices) that capture high quality still pictures and videos. With these integrated cameras, smartphones are often utilized to conduct video communication sessions with one or more second devices. Given the limitations in the display's screen size and enhances provided by ready for video conferencing applications, persons engaged in video communication sessions with their smartphones often attach their devices to a much larger display screen (e.g., an external television, monitor, or computer with a larger screen) to clearly present both the video received from the communication session and a preview of the locally captured video from the field of view of the image capturing device. The smartphones are wired or wirelessly connected to the larger display screen, with the better-quality rear cameras of the smartphone typically being used to capture the local video.

Most video communication applications include an option that allows the user to turn the local video feed on or off. Typically, when the local video is "on", the video captured by the image capturing device is forwarded as a live video feed that is transmitted to the second (receiving) devices communicatively connected to the video communication session. These second devices then locally present the received live video feed on their respective second display devices. Occasionally, the live video feed may freeze or otherwise appear with a lower than desired quality, which degrades the experience of the other users participating in the video conference. Also, the user may at times forget to turn off the local video when not paying attention or otherwise not fully engaged with the video communication session, allowing the remote participants to become aware of the local user's distracted state.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
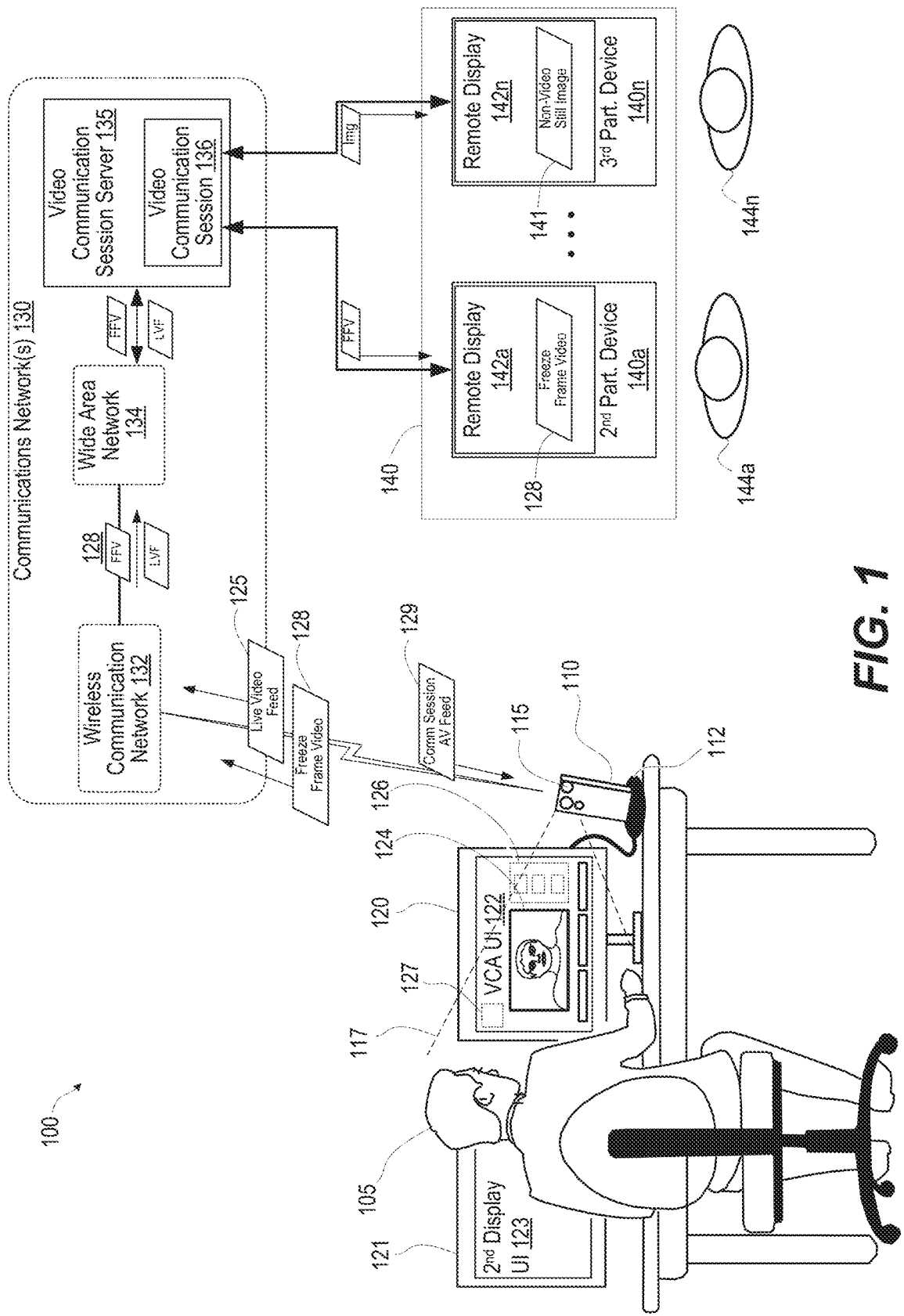
FIG. 1 illustrates an example video communication session environment having an electronic device providing a freeze frame video to at least one second electronic device via a video communication session, according to one or more embodiments.

According to one aspect of the disclosure, an electronic device includes a memory having stored thereon a video communication session host module and a freeze frame video support (FFVS) module that collectively enables the electronic device to operate as a video communication session host device with freeze frame video generation and presentation capabilities. The electronic device includes a communication subsystem that enables the electronic device to communicatively connect with a plurality of participant devices, including a first participant device and a plurality of second participant devices to a video communication session hosted by the electronic device. The electronic device includes a processor communicatively connected to the communication subsystem and the memory. The processor processes code from the video communication session host module and the freeze frame video support module to enable the electronic device to establish the video communication session between the first participant device and more than one second participant devices among the plurality of second participant devices. The processor receives, from the first participant device, a first video feed of a first participant to the video communication session, and in response to a trigger condition, temporarily presents, to the video communication session, a first freeze frame video of the first participant in place of the first video feed to represent video content from the first participant device.

According to another aspect of the disclosure, an electronic device, a method, and a computer program product provides context-based, freeze frame video functionality for a first participant connected via a participant electronic device to a video communication session with other participants. According to a first aspect, the electronic device includes at least one image capturing device (ICD) that captures video and images from a field of view (FOV) of the at least one image capturing device and a communication subsystem that enables the electronic device to communicatively connect to at least one other second electronic device via a video communication session. The electronic device also includes a memory having stored thereon a video communication module and a freeze frame video (FFV) module with program code for selectively presenting a freeze frame video based on detected participant and device contexts. The electronic device includes at least one processor communicatively coupled to the at least one ICD, the communication subsystem, the communication interface, and to the memory. The at least one processor processes program instructions of the video communication module and the FFV module, which configures the electronic device to: determine that a local participant is connected via the electronic device to an ongoing video communication session with second participants having corresponding second participant devices. The processor configures the electronic device to capture, via the image capturing device, local video encompassing the field of view. The processor determines, via artificial intelligence (AI), a video segment of the local video to identify as a freeze frame video, and the processor presents the freeze frame video to the video communication session in response to a trigger condition that pauses a presentation of live video feed of the local participant to the video communication session. According to one aspect, in presenting of the freeze frame video, the processor loops the presentation of the freeze frame video for a period of time at least one of (i) the trigger condition is removed or (ii) an expiration of a threshold maximum time established for presenting the freeze frame video or (iii) detection of a second trigger that re-activates transmission of the first video feed from the first participant device.

According to one or more embodiments, the processor receives, via the communication subsystem, the first freeze frame video from the first participant device, and the processor associates the first freeze frame video with the first participant device in a freeze frame mapping resource. The processor then retrieves and presents the first freeze frame video in response to detection of at least one trigger condition from among a group that includes, but is not limited to including: a loss of a video feed signal from the electronic device; a noticeable degradation in quality of a presentation of the first video feed; detection of a static freeze frame in locally captured video feed received from the first participant device; and detection of a specific condition occurring within the video feed of the first participant device. According to one or more embodiments, the specific condition can be one from among a group that includes a facial expression, a gesture, a movement, a local ambient condition, and activity occurring in a field of view of an image capturing device of the first participant device.

According to another aspect of the disclosure, the processor receives notification of an input at the first participant device that turns on contextual freeze frame video functionality of a video communication application of the first participant device. The processor, in response to receiving the notification, monitors the received first video feed for detection of one or more of a gesture or a facial expression that corresponds to an activation input for initiating a presentation of the first freeze frame video. The processor initiates the presenting of the freeze frame video in response to detection of the activation input.

According to yet another aspect of the disclosure, the processor determines a video segment of the received first video feed to identify as the first freeze frame video, the video segment presenting the first participant as attentive to the video communication session. The processor then generates the first freeze frame video from the video segment and stores the first freeze frame video within a server repository for later use. In one or more embodiments, in determining a video segment of the received first video feed to identify as the first freeze frame video, the processor receives and buffers the first video feed and analyzes the first video feed for contextual information that correlates to an action or inaction to be performed by the first participant that requires a current video of the first participant to be temporary removed from being fed to other participants of the video communication session. The processor selects a specific freeze frame video start point and determines a length of the video segment, based on the contextual information.

Each of the described features and functions of the various different aspects, which are presented as operations performed by the processor(s) of electronic devices are also described as features and functions provided by a plurality of corresponding methods and computer program products, within the various different embodiments presented herein. In the embodiments presented as computer program products, the computer program product includes a non-transitory computer readable storage device having stored thereon program instructions or code that, when processed by at least one processor of an electronic device, such as is described above, enables the electronic device to complete the functionality of a respective one of the above-described electronic device processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

One motivation for the above-described freeze frame video feature is a recognition that there are scenarios during which a participant in a video communication session may wish to turn off their live video feed or pause the transmission without going off screen. The single frame option that provides a still image while the camera is off alerts/informs the other participants that you are offline and may be otherwise engaged while off-camera. Possible reasons for initiating this single frame or off-camera blank video feed can be to sneeze, take a bathroom break, get a cup of coffee/water, eat a snack or meal, accommodate for slow Internet speed. Additionally, there are instances where a participant may want to present an object and has to do so by holding the object in front of the device camera for a period of time. There are also instances in which a participant desires to appear as if the participant is paying attention, while actively engaged with doing something else, such as looking at or working off a secondary screen. Conventional freeze frame options allow the participant to activate the option, and capture and provide a single image of the participant during these instances, rather than having to turn off the live video feed or stay in place for the duration of the presentation of the object. The conventional freeze frame solution is both manual and static, without any intelligence, thus making the experience tedious. A static frame, which is captured and presented using the freeze frame function, often gives the impression that participant's video feed has frozen or that the network has disconnected. This "frozen" image feed can be distracting to the other participants, which diminishes the overall experience of the video communication call. The disclosure provides AI driven enhancements to video communication session applications that utilize a smartphone to capture the video of the participant to the communication session.

As utilized herein, the term "participant or user" generally refers to a person who is communicating with other participants using respective participant devices coupled to a video communication session. Using AI, and based on a setting of the participant's device, the electronic devices are able to generate freeze frame videos from a live video stream and replay the freeze frame video, as needed, in response to a context-based trigger. In different implementations, the field of view of the image capturing device can be of a non-human entity, object or being, such that a human participant is not necessarily required for implementing the specific features of the disclosure. For example, the participant can be an animal, such as a dog. However, all of the disclosed embodiments assume there is a human participant visible within the FOV, visible at least during some periods of the video communication session.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within participant electronic/electronic device 110 (FIGS. 2 and 3) and VCS host electronic device 135 (FIG. 7) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example video communication session (VCS) environment 100 having an electronic device 110 providing a freeze frame video to at least one second electronic device 140a-140n via a video communication session 136, according to one or more embodiments. Electronic device 110 is a mobile electronic device that (i) supports video communication with other electronic devices and (ii) includes one or more image capturing devices/sensors (i.e., cameras). In one or more embodiments, electronic device 110 includes the capability of being utilized as a web camera during the video communication session. In one or more embodiments, electronic device 110 is a mobile phone and/or incorporates the features of a mobile phone. According to one or more embodiment and throughout the description which follows, electronic device 110 can be interchangeably referred to as participant device, first participant device, and/or first participant electronic device, etc. As an example, electronic device 110 can be interchangeably referred to as first participant device 110 to distinguish from second participant devices 140 (140a-140n) that can also be electronic devices, such as mobile phones or laptops, in one or more embodiments. For simplicity in describing certain features of the disclosure, where second participant devices 140a-140n are individually referenced, second participant devices 140a-140n can be individually presented as second participant device 140a and third participant device 140n, etc.

VCS environment 100 includes local participant 105 who communicatively connects to video communication session 136 using electronic device 110 that is wired or wirelessly connected to local display device 120. Electronic device 110 is positioned on a desk proximate to local participant 105. In the described embodiments, electronic device 110 is a smartphone held by docking hub/dongle 112 and includes at least one (and potentially multiple) image capturing sensor/device (ICD) 115. Docking dongle 112 provides a wired connection to local display device 120 on which video images captured by ICD 115 and video feeds (129) received from video communication session 136 can be displayed for viewing by local participant 105. ICD 115 captures a field of view (FOV) (illustrated by the dashed lines and generally presented as FOV 117) of the local surroundings, which includes local participant 105, in the illustrative embodiment. ICD 115 generates live video/images of local participant 105 (i.e., the images/video captured within the FOV) for transmitting to video communication session 136 via operation of a video communication application (VCA) executing locally on electronic device 110 and/or a computer system (not specifically shown) to which electronic device 110 is connected to provide web camera functionality. VCA generates VCA user interface (UI) 122 presented on display device 120. VCA UI 122 presents an in-focus video 124, which is the main video being shown on the respective devices of each participant to the VCS. VCA UI 122 can also present a participant window 126 showing the local video or the still/null video/images of each of the participants, including that of local participant 105. In at least one embodiment, a preview image 127 is also presented to local participant, presenting local participant with the preview of the video images being captured in the FOV of the ICD 115.

Display device 120 is external to electronic device 110 and can thus be referred to as external display device 120. Electronic device 110 can also include an integrated display on one or more surfaces of electronic device 110. In the illustrated example situation, local participant 105 is also interfacing with a second local display device 121 on which a separate user interface (UI) 123 provides content for viewing and/or interfacing by local participant 105. As an example, second local display device 121 can present work-related content, which may require local participant 105 to shift his/her view from local display device 120 and/or ICD 150 towards second local display device 121, while local participant 105 is connected to video communication session 136. In at least one embodiment, a distracted local participant context is assigned to trigger presentation of a selected freeze frame video that shows the local participant looking towards the local display device 120 and/or the ICD 115, to present the local participant as being still engaged with the VCS 136, while the local participant 105 looks towards and/or interfaces with the work-related content on the second local display device 121.

According to one aspect of the disclosure, electronic device 110 generates and transmits, to the VCS, at least one freeze frame video 128 in addition to and/or in place of live video feed 125, based on one or more contexts that serve as automatic triggers for activating the presentation of a selected freeze frame video 128. Freeze frame video 128 is transmitted through communications network 130, which includes wireless communication network 132 and associated physical networking components and wide area network 134 and associated physical networking components. Wide area network 134 provides or supports connection by video communication session (VCS) server(s) 135, which is one or more physical components or logical partitions within server devices that process server-level functions for video communication session 136. FFV 128 is forwarded by VCS server(s) 135 to each session-connected second electronic device, i.e., second participant devices 140a-140n, which presents the received video feed 128 on respective remote display devices 142 for viewing by their respective remote participants 144a-144n. Second participant devices 140a-140n are shown having second displays, which are remote displays 142a-142n on which FFV 128 can be presented. According to one aspect, a granular application of the FFV feature can be implemented to allow only some of the second participant devices 140 (e.g., second participant device 140a) to receive and present the FFV 128 from first participant device 110, while other second participant devices, e.g., third participant device 140n, receive a still image or null image 141 instead of the FFV. Additional details related to this granular implementation will be presented in the description of FIG. 9.

Figure 2:
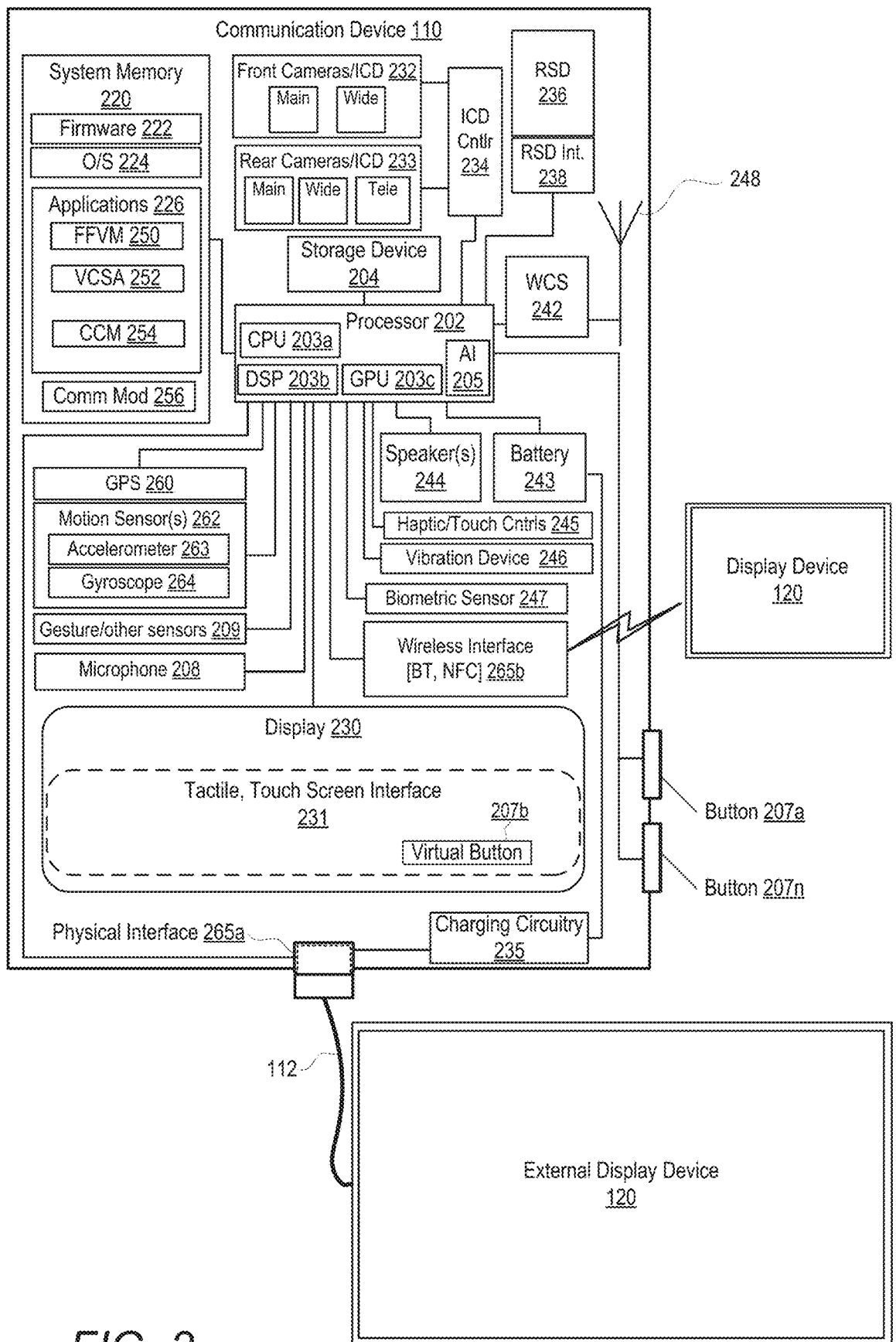
FIG. 2 depicts an example component makeup of the electronic device used to engage in the video communication session and within which various aspects of the disclosure can be implemented, according to one or more embodiments.

FIG. 2 depicts an example component makeup of electronic device 110 of FIG. 1, with specific components used to enable the device to engage in a video communication session and within which various aspects of the disclosure can be implemented, according to one or more embodiments. Examples of electronic device 110 include, but are not limited to, mobile devices, a notebook computer, a mobile phone, a smart phone, a digital camera with enhanced processing capabilities, a smart watch, a tablet computer, and other types of electronic device that incudes or can be directly connected to an ICD that captures video. It is appreciated that electronic device 110 can be other types of electronic devices that include at least one camera or one rear facing camera and which supports both video and non-video communication with one or more second electronic devices.

Electronic device 110 includes processor 202 (or processor integrated circuit (IC) chip), which includes processor resources such as central processing unit (CPU) 203*a*, communication signal processing resources such as digital signal processor (DSP) 203*b*, and graphics processing unit (GPU) 203*c*. Processor 202 can, in some embodiments, include high quality camera image signal processors (ISPs) (not shown) and dedicated artificial intelligence (AI) engines 205. Collectively, processor 202 supports computing, classifying, processing, transmitting and receiving of data and information, and presenting of graphical images within a display. Processor 202 is communicatively coupled to storage device 204, system memory 220, input devices, introduced below, output devices, including integrated display 230, and image capture device (ICD) controller 234. According to one or more embodiments, ICD controller 234 performs or supports functions such as, but not limited to, selecting and activating an active camera from among multiple cameras and adjusting the camera settings and characteristics (e.g., shutter speed, f/stop, ISO exposure, zoom control, etc.) of the active camera, etc. ICD controller 234 can perform these functions in response to commands received from processor 202, which processes instructions of camera control module 254) of ICDs 232, 233 to capture video images of a local scene within a FOV (117, FIG. 1) of the operating ICD. In one or more embodiments, the functionality of ICD controller 234 is incorporated within processor 202, eliminating the need for a separate ICD controller.

For simplicity in describing the features presented herein, the various camera selection, activation, and configuration functions performed by the ICD controller 234 are described as being provided generally by processor 202. Similarly, manipulation of captured images and videos are typically performed by GPU 203*c*, and certain aspects of device communication via wireless networks are performed by DSP 203*b* with support from CPU 203*a*. However, for simplicity in describing the features of the disclosure, the functionality provided by one or more of CPU 203*a*, DSP 203*b*, and GPU 203*c* are collectively described as being performed by processor 202.

Throughout the disclosure, the term image capturing device (ICD) is utilized interchangeably to be synonymous with and/or refer to any one of front or rear facing cameras 232, 233. Front facing cameras 232 and rear facing cameras 233 are communicatively coupled to ICD controller 234, which is communicatively coupled to processor 202. Both sets of cameras 232, 233 include image sensors that can capture images that are within the field of view (FOV) of respective ICD 232, 233. Electronic device 110 can include multiple cameras having different functionality, such as a main camera capturing standard view, wide angle camera that captures a wide angle FOV, and telephoto ICD, which captures a telephoto FOV (zoom or magnified). In one or more embodiments, a single camera can be provided with camera control options to change the single camera lens to allow for wide angle and telephoto image capture.

System memory 220 may be a combination of volatile and non-volatile memory, such as random access memory (RAM) and read-only memory (ROM). System memory 220 can store program code or similar data associated with firmware 222, an operating system 224, and/or applications 226. During device operation, processor 202 loads and executes/processes program code of the various applications, modules, OS, and firmware, that are stored in system memory 220.

In accordance with one or more embodiments, applications 226 include, without limitation, video communication session application (VCSA) 252, freeze frame video (FFV) module 250, camera control module 254, and communication module 256. As provided in the figure, FFVM 250 is a separate module that integrates its functionality within an existing VCSA 252. In one or more alternate embodiments, FFV module (FFVM) 250 is a module within (i.e., a sub-component of) VCSA 252. Each module and/or application (250-256) provides program instructions that are processed by processor 202 to cause processor 202 and/or other components of electronic device 110 to perform specific operations, as described herein. Descriptive names assigned to these modules add no functionality and are provided solely to identify the underlying features performed by processing of the different modules. For example, VCSA 252 and communication module 256 include program instructions that supports electronic device 110 establishing a communication session with other external devices and systems, such as VCS server 135 and second electronic devices 140*a*-140*n*. FFVM 250 includes program instructions that configure processor 202 and/or an AI program to generate a freeze frame video (FFV) from a live video feed and then present the FFV in place of a standard static image or in the event of a low-quality connection or other condition that triggers the presentation of the FFV. FFVM 250 can provide additional functions.

In one or more embodiments, electronic device 110 includes removable storage device (RSD) 236, which is inserted into RSD interface 238 that is communicatively coupled via system interlink to processor 202. In one or more embodiments, RSD 236 is a non-transitory computer program product or computer readable storage device. RSD 236 may have a version of one or more of the applications (e.g., 250, 252, 254) stored thereon. Processor 202 can access RSD 236 to provision electronic device 110 with program code that, when executed/processed by processor 202, the program code causes or configures processor 202 and/or generally electronic device 110, to provide the various different FFV functions described herein.

Electronic device 110 includes an integrated display 230 which incorporates a tactile, touch screen interface 231 that can receive user tactile/touch input. As a touch screen device, integrated display 230 allows a user to provide input to or to control electronic device 110 by touching features presented within the display screen. Tactile, touch screen interface 231 can be utilized as an input device. In some implementations, integrated display 230 is integrated into a front surface of electronic device 110, while the higher quality ICDs are located on a rear surface. Electronic device 110 is placed in an orientation with the higher quality ICDs facing the scene being captured (e.g., with a FOV of the local participant) and integrated display located away from the subject of interest.

As one aspect of the disclosure, electronic device 110 also includes external display device 120, which is communicatively coupled to electronic device 110 via a physical interface 265*a* or a wireless interface 265*b*. Display device 120 can be one of a wide variety of display screens or devices, such as a liquid crystal display (LCD) and an organic light emitting diode (OLED) display.

Wireless interface 265*b* can be a short-range wireless electronic device providing Bluetooth, near field communication (NFC) and/or a wireless fidelity (Wi-Fi) connections. In one embodiment, electronic device 110 can receive internet or Wi-Fi based calls via wireless interface 265*b*. In one embodiment, electronic device 110 can communicate wirelessly with externally-provided WiFi router via wireless interface 265*b*. In an embodiment, WCS 242, antenna(s) 248, and wireless interface 265*b* collectively provide communication interface(s) of electronic device 110. These communication interfaces enable electronic device 110 to communicatively connect to at least one second electronic device 140 (FIG. 1) via at least one network.

Physical interface 265a of electronic device 110 can serve as a data port and can be coupled to charging circuitry 235 and device battery 243 to enable recharging of device battery 243. To enable the audio communication aspects for video communication session, electronic device 110 further includes microphone 208, gesture/other sensors 209 (enabling gesture detection by local participant), one or more output devices such as speakers 244, and one or more input buttons 207a-207n. Input buttons 207a-207n may provide controls for volume, power, and ICDs 232, 233. According to one or more embodiments, input buttons 207a-207n can include dedicated hardware button 207a and dedicated virtual bottom 207b for use to activate/initiate freeze frame presentation function via manual selection. Microphone 208 can also be referred to as an audio input device. Microphone 208 and input buttons 207a-207n can also be referred to generally as input devices.

Electronic device 110 further includes wireless communication subsystem (WCS) 242, which can represent one or more front end devices (not shown) that each coupled to one or more antennas 248. In one or more embodiments, WCS 242 can include a communication module with one or more baseband processors or digital signal processors, one or more modems, and a radio frequency (RF) front end having one or more transmitters and one or more receivers. WCS 242 and antennas 248 allow electronic device 110 to communicate wirelessly with a wireless communication network 132 (FIG. 1) via transmissions of communication signals to and from network electronic devices, such as base stations or cellular nodes, of wireless communication network 132.

Wireless communication network 132 further allows electronic device 110 to wirelessly communicate with second electronic devices 140a-140n, which can be similarly connected to wireless communication network 132. Electronic device 110 can also communicate wirelessly with wireless communication network 132 via communication signals transmitted by short range electronic device(s) to and from an external WiFi router, which is communicatively connected to wireless communication network 132. In one or more embodiment, wireless communication network 132 can be interconnected with a wide area network that can include one or more servers (e.g., VCA server 135) that support exchange of audio and video messages and other communication between electronic device 110 and second electronic devices 140a-140n.

Electronic device 110 further includes haptic touch controls 245, vibration device 246, fingerprint/biometric sensor 247, global positioning system (GPS) device 260, and motion sensor(s) 262. Vibration device 246 can cause electronic device 110 to vibrate or shake when activated. Vibration device 246 can be activated during an incoming call or message in order to provide an alert or notification to a user of electronic device 110. In one or more embodiments, vibration device 246 can be used to inform the user when FFV is being generated and/or when a FFV is being presented by electronic device 110. According to one aspect of the disclosure, integrated display 230, speakers 244, and vibration device 246 can generally and collectively be referred to as output devices.

Biometric sensor 247 can be used to provide biometric data, such as fingerprints, to identify or authenticate a user. GPS device 260 can provide time data and location data about the physical location of electronic device 110 using geospatial input received from GPS satellites. Motion sensor(s) 262 can include one or more accelerometers 263 and gyroscope 264. Motion sensor(s) 262 can detect movement of electronic device 110 and provide motion data to processor 202 indicating the spatial orientation and movement of electronic device 110. Accelerometers 263 measure linear acceleration of movement of electronic device 110 in multiple axes (X, Y and Z). Gyroscope 264 measures rotation or angular rotational velocity of electronic device 110. In one or more embodiments, the measurements of these various sensors can also be utilized by processor 202 in the determining of the context of a communication. Electronic device 110 further includes housing that contains/protects the components internal to electronic device 110.

Figure 3:
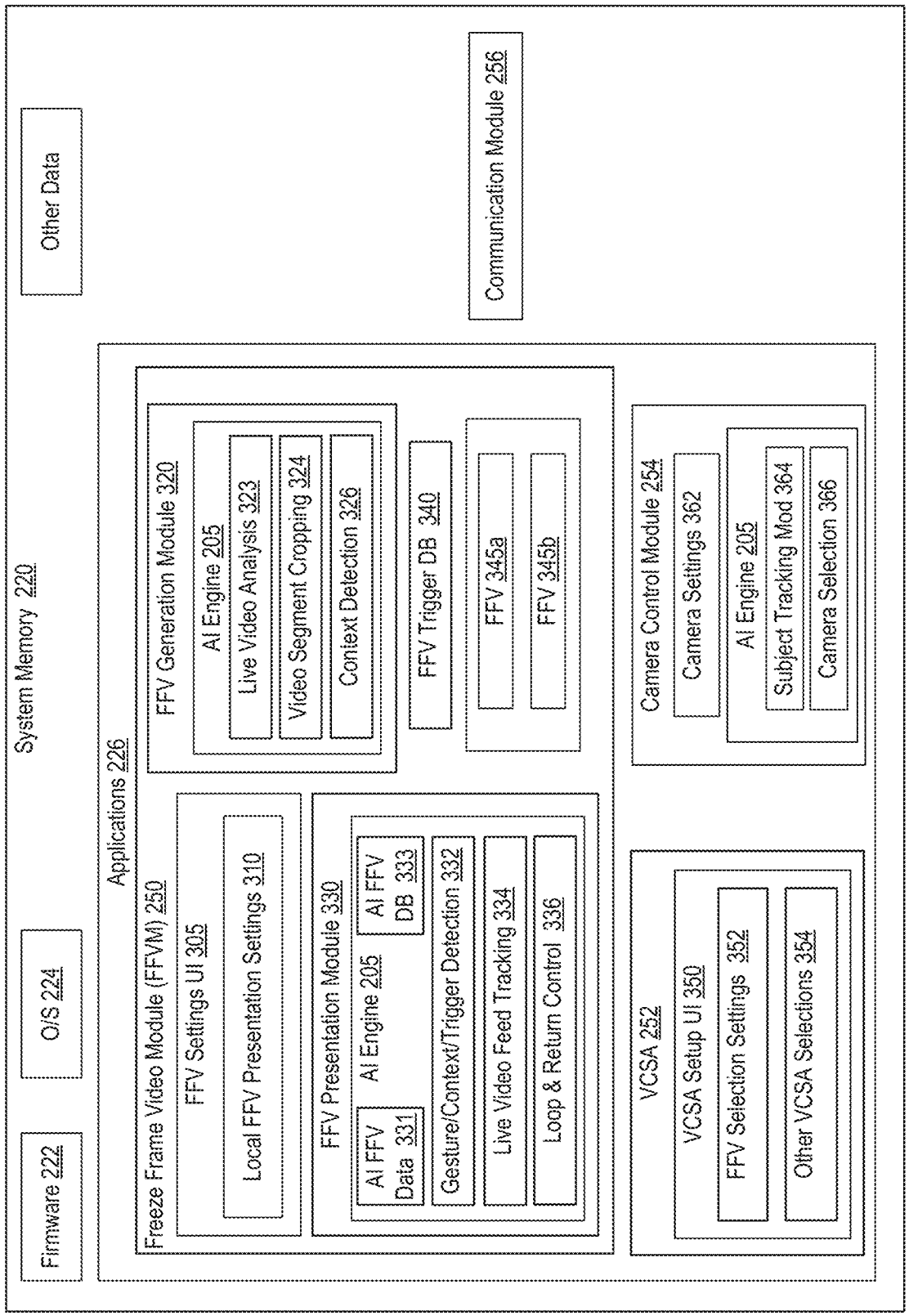
FIG. 3 is a block diagram representation of example contents of the system memory of the example electronic device of FIG. 2, which contents collectively enable the device processor to complete several of the disclosed features, according to one or more embodiments.

FIG. 3 is a block diagram representation of example contents of the system memory of example electronic device 110 of FIGS. 1 and 2, which contents collectively enable the device processor to complete several of the disclosed features, according to one or more embodiments. Processor 202 processes program code and utilizes specific data from within memory to collectively enable several of the disclosed features, according to the various embodiments. As generally introduced within FIG. 2, system memory 220 includes data, software, and/or firmware modules, including firmware 222, operating system 224, applications 226, and communication module 256. Applications generally include FFVM 250, VCSA 252, and camera control module (CCM) 254.

Figure 4:
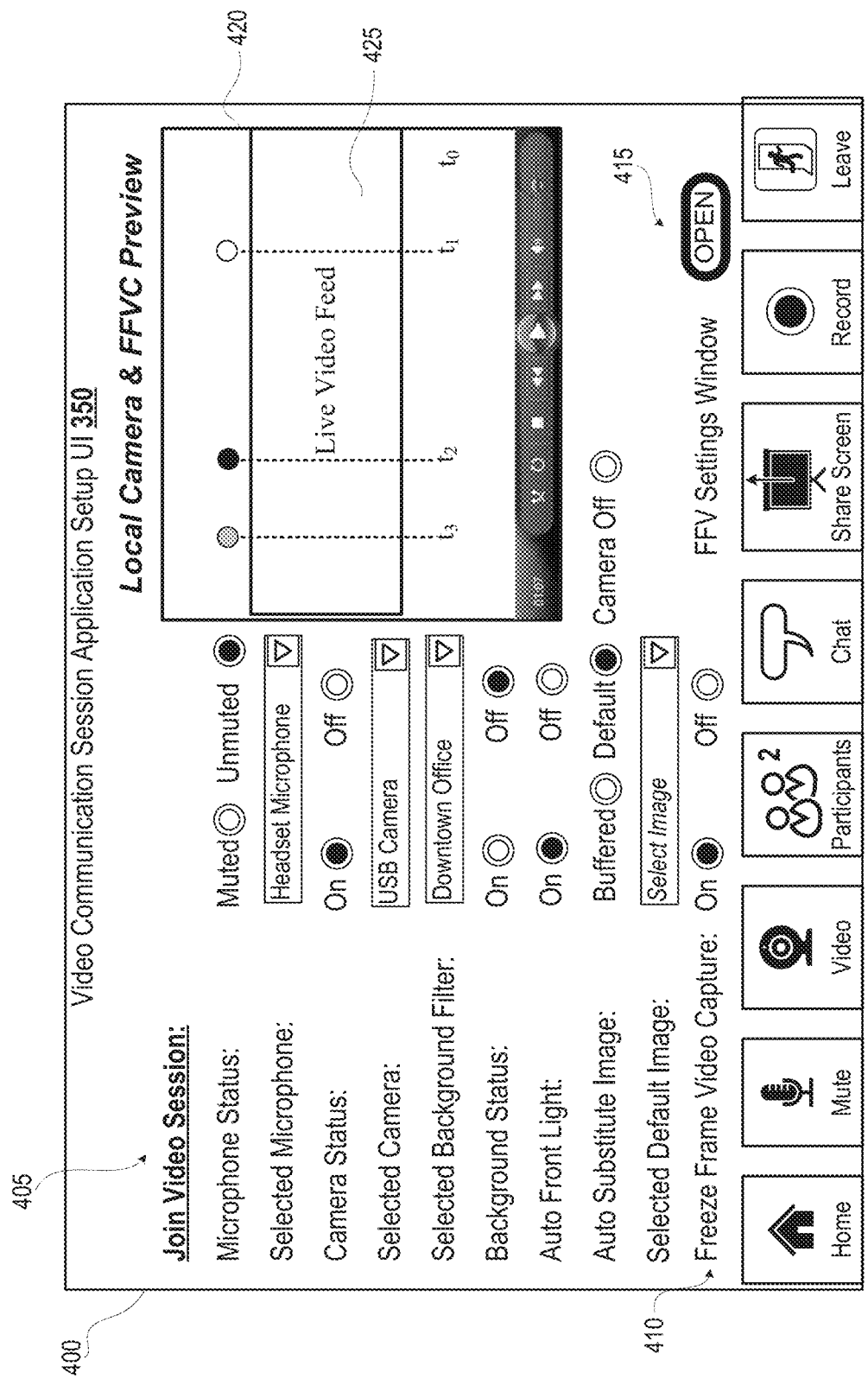
FIG. 4 depicts a setup user interface for a video communication application operating on the electronic device and presenting user selectable options for activating local or remote freeze frame video generation from a live video feed, in accordance with one or more embodiments.

VCSA 252 includes code for VCSA setup user interface (UI) 350, within which are code for FFV selection settings 352 and other VCS application settings/selections 354. FIG. 4 depicts an example setup user interface for a video communication application operating on the electronic device and presenting user selectable options for activating local or remote freeze frame video generation from a live video feed, in accordance with one or more embodiments. Specially, FIG. 4 presents example VCSA setup UI 350 presented on display screen 400 of example display device 120. VCSA setup UI 350 includes a video selection menu 405 that lists different functions that can be selected or adjusted/modified by the user. Illustrated at the bottom of video selection menu 405 is freeze frame video capture 410, which has associated on and off selection buttons, with the "on" option selected. To the right of on/off selections for FFV capture 410 is open button 415 for opening FFV settings window option, which triggers opening of FFV setup/settings UI 305. VCSA setup UI 350 includes a video preview inset window 420 in which is presented live video feed 425 from which segments of video (e.g., from time t1 to t2/t3) can be cropped during generation of a freeze frame video. According to one embodiment, user selection of the activation input (e.g., open button 415) of FFV settings window option from within VCSA setup UI 350 activates and presents FFV setting UI 305 (FIG. 5) on display device 120.

Figure 5:
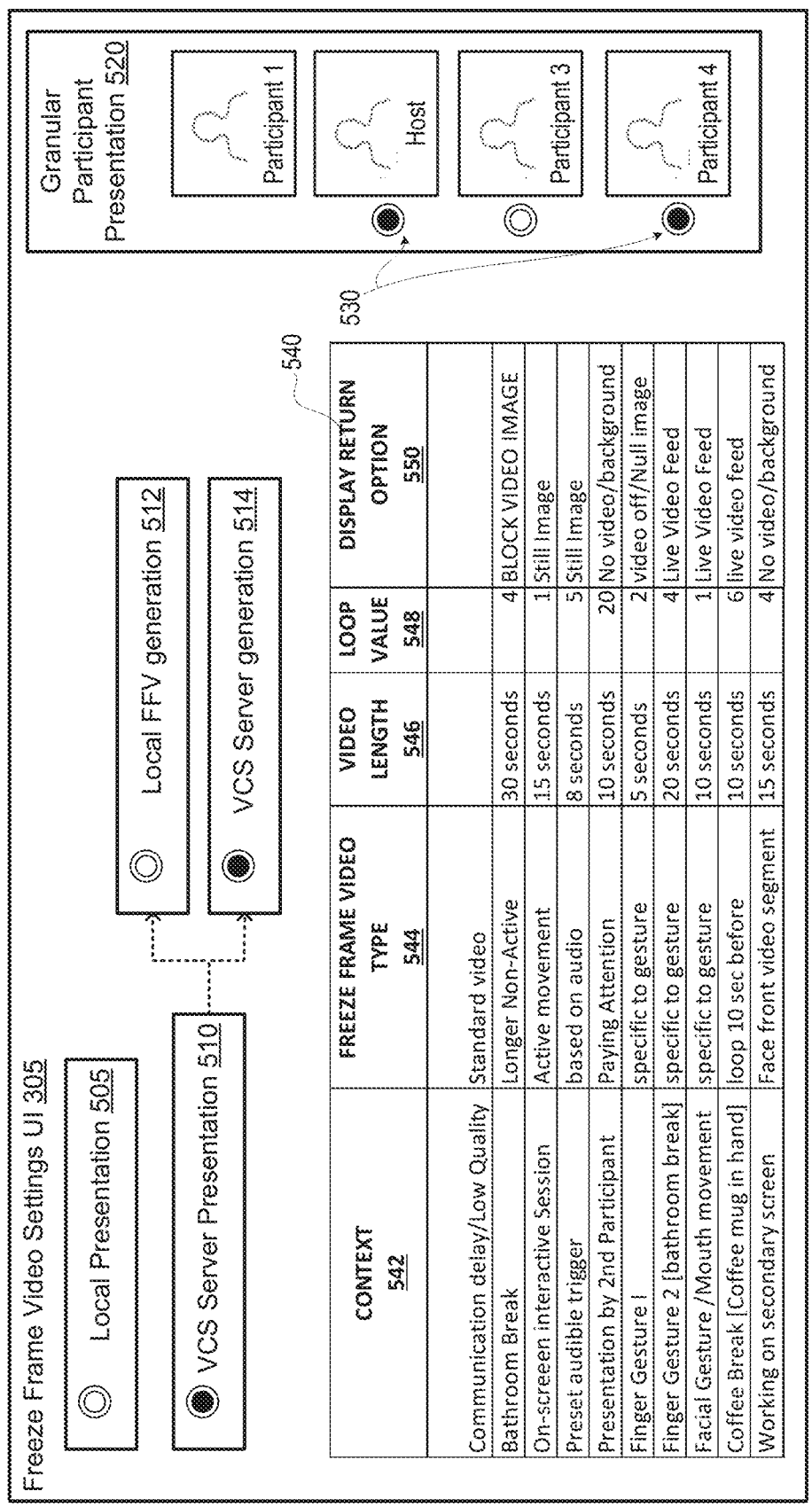
FIG. 5 illustrates an example context-based freeze frame preferences selection table that is generated based on user input/selection of preferences for using freeze frame video functionality, according to one or more embodiments.

Returning to FIG. 3, FFVM 250 includes code for FFV settings UI 305, which provides a series of selectable options for setting up and presenting FFVs, including local FFV presentation settings 310. FIG. 5 illustrates an example FFV settings UI 305.

With reference now to FIG. 5, FIG. 5 illustrates an example context-based freeze frame preferences selection table that is generated and presented on a display of a local participant device based on user input/selection of preferences for using freeze frame video functionality, according to one or more embodiments. Specifically, FIG. 5 illustrates features of an example FFV settings UI 305, according to one or more embodiments. As shown, FFV settings UI 305 includes selection boxes that enable user election of local device presentation 505 or remote server presentation 510 of the freeze frame videos. When remote server presentation is selected, additional selection options are provided for local FFV generation 512 and server FFV generation 514, whereby the user is able to set the FFV generation to be completed by the local device or at the VCS server. In one or more embodiments, FFV settings UI 305 includes a participants list 520 with FFV sharing selections 530 next to each individual participant in participants list 520. FFV sharing selections 530 enables the local user to granularly (individually) select which second participants will receive the freeze frame video of the first participant. As shown, FFV sharing selections 530 for the host (who is also the second participant) and participant 4 have been selected, while the selections button for participant 3 has not been selected. When activated, the FFV of the first participant is thus shown only to the host and participant 4, while participant 3 receives the original live feed, a standard still image, or a null (video off) image in lieu of a FFV.

FFV settings UI 305 includes a database (or table) 540 listing a series of different context 542 that can operate as triggers for activating the freeze frame video, the type of FFV 544 that is activated based on the context, as well as the length of the FFV 546 and number of loops 548 of the FFV. FFV settings UI 305 also includes a display return option 550 which identifies what type of image or video feed or null video to provide, following completion of the looping of the FFV. One or more of the values provided within FFV DB 540 can be generated by AI engine, in one embodiment. In some embodiments, one or more of the entries and/or selections can be entered by the user.

Returning to FIG. 3, FFVM 250 includes a FFV generation module 320 and FFV presentation module 330. FFV generation module 320 includes or incorporates an AI engine 205, which provides the functions of live video analysis 323, video segment cropping 324, and context detection 326 (i.e., to identify when to initiate generation of an FFV). FFV presentation module 330 includes or incorporates an AI engine 205 which provides the functions of gesture/context/trigger detection 332 for activation and/or and termination of the presentation of a FFV, live video feed tracking 334 that enables the live feed to continue to be provided to a local display, and loop and return control 336 that controls how long the FFV is looped and what content (if any) is presented when the FFV presentation ends or is terminated/interrupted. AI engine 205 includes AI FFV data 331 and AI FFV database 333, which can be a gesture database 333, in one embodiment. FFVM 250 is shown having FFV trigger database (DB) 340 and two FFVs 345*a*-345*b* that are locally maintained. FV trigger DB 340 maintains a mapping of different contextual and gesture-based triggers that can initiated generation of a FFV and/or presentation of a FFV and subsequent stopping of the presentation of the FFV.

FFVM 250 includes or utilizes a local representation of AI engine 205, which provides the functions described herein. In one or more embodiments, AI engine 205 receives video image stream 322 and identifies, by analyzing the content of the video, that local participant is paying attention to the video session (e.g., looking at the camera or towards the presented video output) stream or making acceptable gestures or movements during the VCS that indicates the local participant is paying attention to the VCS. Once AI engine 205 makes that determination, AI engine 205 initiates a recording of a segment of live video stream for generation of an FFV. AI engine 205 later monitors for certain contexts that triggers the retrieval and presentation of the FFV. In response to detecting the context/trigger, AI engine 205 provides processor 202 with the specific FFV that is triggered to be presented, based on the detected context/trigger.

In one embodiment, AI engine 205 monitors video image stream 322 for specific gestures made by the local participant during the VCS. AI engine 205 includes or references AI FFV data 331 and AI FFV gesture DB 333 thus includes a listing of detected hand gestures/inputs detected by the ICD and AI FFV gesture identifying/interpreting database 333 that can include various different hand/facial gestures or hand/finger movements that correspond to a selection/activation of an action feature/function corresponding to presentation of a specific FFV. It is appreciated that one or more of the presented AI engine operations may be performed by other processor components.

Communication module 256 within system memory 220, enables electronic device 110 to communicate with wireless communication network 132 and with other devices, such as second electronic devices 140, via one or more of audio, text, and video communications. Communication module 256 can support various communication sessions by electronic device 110, such as audio communication sessions, video communication sessions, text communication sessions, electronic device application communication sessions, or a dual/combined audio/text/video communication session.

CCM 254 includes camera parameters and settings 362, and AI engine 305, which further includes subject tracking module 364 and camera selection module 366. Camera parameters and settings 297 can include fixed values such as focal length, maximum frame rate, and resolution and variable values such as light level values, directional values, and distances to objects within a camera FOV. Camera parameters and settings 297 are values and characteristics that can change during the operation of ICDs 232, 233 to capture images by the cameras. Camera parameters and settings 266 can include various settings such as aperture, shutter speed, iso level, white balance, zoom level, directional settings (i.e., region of interest (ROI)), distance settings, focus and others. In one embodiment, camera parameters and settings 266 can be determined by either processor 202 or by ICD controller 234 or AI engine 205. In one embodiment, camera parameters and settings 266 can be adjusted by the local participants participant's use of gestures that are captured by the ICD and associated with one or more of the FFV functions within the currently displayed UI. Subject tracking module 364 allows ICDs to zoom in and adjust a focal position of the lens within the ICD to allow the ICD to maintain a view of the user, while in the FOV of the ICD and, in particular, during generation of the FFV.

Each of the various modules and applications includes program instructions/code that is processed by processor 202 and, in some instances by AI engine 205, to configure electronic device 110 to perform the various different features of the present disclosure. In one or more embodiments, several of the modules include a representation (or code segments) of AI engine 205, which can further include a machine learning (ML) engine (not separately shown) and computer vision (CV) engine (not separately shown). In one embodiment, AI engine 205 enables electronic device 110 to (i) identify a segment of a locally-captured, live video stream, (ii) crop the segment to generate a freeze frame video, (iii) store the freeze frame video for later use based on detection of an associated/assigned context, (iv) identify gesture-based inputs, facial inputs, and other inputs, (v)

associate the gesture-based and/or other identified inputs with an identification of a current context, and (vi) present the freeze frame video to the VCS in place of a live video feed or a still image or null video, as well as other features and functions presented herein. In one or more embodiments, execution (or processing) of the various modules by processor 202 enables/configures electronic device 110 to perform the method processes presented in the various different flowcharts, as will be described below.

Collectively, according to specific aspects of the disclosure, the illustrative embodiments of FIGS. 1-5 provides an electronic device 110 that includes the aforementioned ICD, a communication interface to a local display device, and a communication subsystem. The electronic device 110 includes the memory which has stored thereon a video communication session module and a freeze frame video (FFV) module with program code for selectively presenting a freeze frame video based on detected participant and/or device contexts. The electronic device includes at least one processor communicatively coupled to the at least one ICD, the communication subsystem, the communication interface, and to the memory. The at least one processor processes program instructions of the video communication module and the FFV module, having program instructions/code that configures the electronic device to determine that a local participant is connected via the electronic device to an ongoing video communication session with second participants having corresponding second participant devices. The electronic device is further configured to capture, via the image capturing device, local video encompassing the field of view and determine a video segment of the local video to identify as a freeze frame video.

It is appreciated that the local video, which is the live video captured by the ICD can include a different object or content than a video of local participant. Thus, the presentation of the local participant within the captured live video is solely for example, as the FFV features are fully applicable to presenting FFV video content that does not include the local participant. The electronic device is further configured to present the freeze frame video to the video communication session in response to any one of a plurality of trigger condition that pauses a presentation of live video feed of the local participant to the video communication session. In presenting the freeze frame video, the at least one processor loops the presentation of the freeze frame video for a period of time until at least one of (i) the trigger condition is removed or (ii) an expiration of a threshold maximum time established for presenting the freeze frame video or (iii) detection of a second trigger that re-activates transmission of the first video feed from the first participant device.

According to one or more aspects, initiating of freeze frame video functionality can be triggered only during certain conditions or in response to one of several pre-identified device or participant states. According to one embodiment, in presenting the freeze frame video, the processor first detects an immobile state of the electronic device from among one of being docked in a docking station or being in a stationary position. The processor initiates the presenting of the freeze frame video in response to the electronic device being in the immobile state.

In yet another embodiment, the electronic device includes a display interface that enables the electronic device to communicatively connect to an external display and transmit video feed of the video communication session for presentation on the external display. Prior to presenting the freeze frame video, the processor detects that the processor is communicatively connected to the external display to present the video feed from the video communication session and that the processor is utilizing the at least one image capturing device as a webcam for the external display. The processor then initiates the presenting of the segment in response to the electronic device being connected to the external display and being used as a webcam.

According to one or more embodiments, the processor determines a number of second participants on the video communication session and compares the number of second participants to a threshold number. The processor then initiates the presenting of the freeze frame video in response to the number of second participants being above the threshold number.

According to yet another embodiment, the processor identifies that the first participant is not currently presenting on and not scheduled to present on, or to become a focus of, the video communication session. The processor initiates the presenting of the first freeze frame video further in response to identifying that the first participant is not currently presenting on and not scheduled to present on, or become the focus of, the video communication session.

In yet another embodiment, the processor determines that a current video focus of the video communication session is at least one of (i) presenting local video of and (ii) presenting content associated with or originating from at least one second participant, whereby the first video feed of the first participant is not currently in focus. The processor then initiates the presenting of the first freeze frame video in response to the first video feed of the first participant not being currently in focus.

According to one embodiment, the electronic device further includes at least one input device communicatively coupled to the processor and which transmits received inputs to the processor. The processor determines that an input received via the at least one input device initiates contextual freeze frame video functionality. The processor then monitors a local video feed for detection of one or more of a gesture or a facial expression that corresponds to an activation input for presenting the freeze frame video and initiates the presenting of the freeze frame video in response to detection of the activation input when the contextual freeze frame video functionality has been initiated.

According to one or more embodiments, in determining a segment of the local video to identify as a freeze frame video, the processor receives the local video, and the processor analyzes the local video for contextual information that correlates to an action or inaction to be performed by the local participant that will require the current live video of the local participant to be temporary removed from being fed to the video communication session. The processor selects a specific freeze frame video start point and determines a length of the specific video, in part based on the contextual information. The processor incorporates, within a generated freeze frame video, a current video setting, a current scene, and any background replacement image enabled by the device user or participant. The processor stores the generated freeze frame video within processor-accessible storage for future access.

According to one or more embodiments, the electronic device includes at least one output device communicatively coupled to the processor, the at least one output device including at least one of an embedded display device and an external display device. In determining a segment of the local video to identify as a freeze frame video, the processor provides at least one prompt, via an output to one or more of the at least one output device, for user preparation to capture upcoming portions of the local video for freeze frame video generation. The processor then selects as the freeze frame video, via an artificial intelligence (AI) module, a specific shorter sequence of a video from among a longer sequence of the local video, the specific shorter sequence of video feed presenting the first participant being attentive to the video communication session.

According to one or more embodiments, the processor establishes the threshold maximum amount of time for looping the generated freeze frame video. With the threshold amount of time and other FFV features established and stored in the FFV DB, once FFV presentation is triggered, the processor monitors an elapsed time from a start of the presenting of the freeze frame video. The processor transitions from presenting the freeze frame video within a transmitted video feed to presenting one of a preset video-off image, a blank image template, or the live video feed, in response to the elapsed time reaching the threshold maximum amount of time. The processor transitions the participant's electronic device from presenting the freeze frame video back to presenting the live video feed in response to a second trigger from among a plurality of different triggers associated with presenting the live video feed. As an example, the processor or AI can identify movement of the participants' mouth that suggests the participant is about to speak.

According to one or more embodiments, to establish the threshold amount of time, the processor identifies a context of the trigger condition from among a plurality of different contexts, each having an associated FFV and a corresponding threshold amount of video loop presentation time. The processor selects and applies the corresponding threshold amount of video loop presentation time based on the identified context.

According to one or more embodiments, the processor forwards the freeze frame video to a VCS host server supporting the video communication session. The VCS server is programed to present the freeze frame video as a video feed from the electronic device to the video communication session in place of the local video feed of the electronic device, in response to one or more of: (i) a loss of a video feed signal from the electronic device; (ii) a noticeable degradation in quality of a presentation of the video feed; (iii) detection of a static freeze frame in the locally captured video feed received from the first participant device; (iv) user activation of a selectable option from among a virtual option and a physical option, which is pre-configured to initiate a presentation of the freeze frame video; and (v) detection of a condition occurring within the video feed of the first participant device. According to one or more embodiments, the condition is one from among a group that includes a facial expression, a gesture, a movement, a local ambient condition, and background activity occurring in a field of view of an image capturing device of the first participant device. According to one or more embodiments, and as illustrated within FIG. 2, either a dedicated hardware button 207a or a dedicated virtual bottom 207b can be provided with electronic device for use to activate/initiate freeze frame presentation function via manual selection.

Figure 6A:
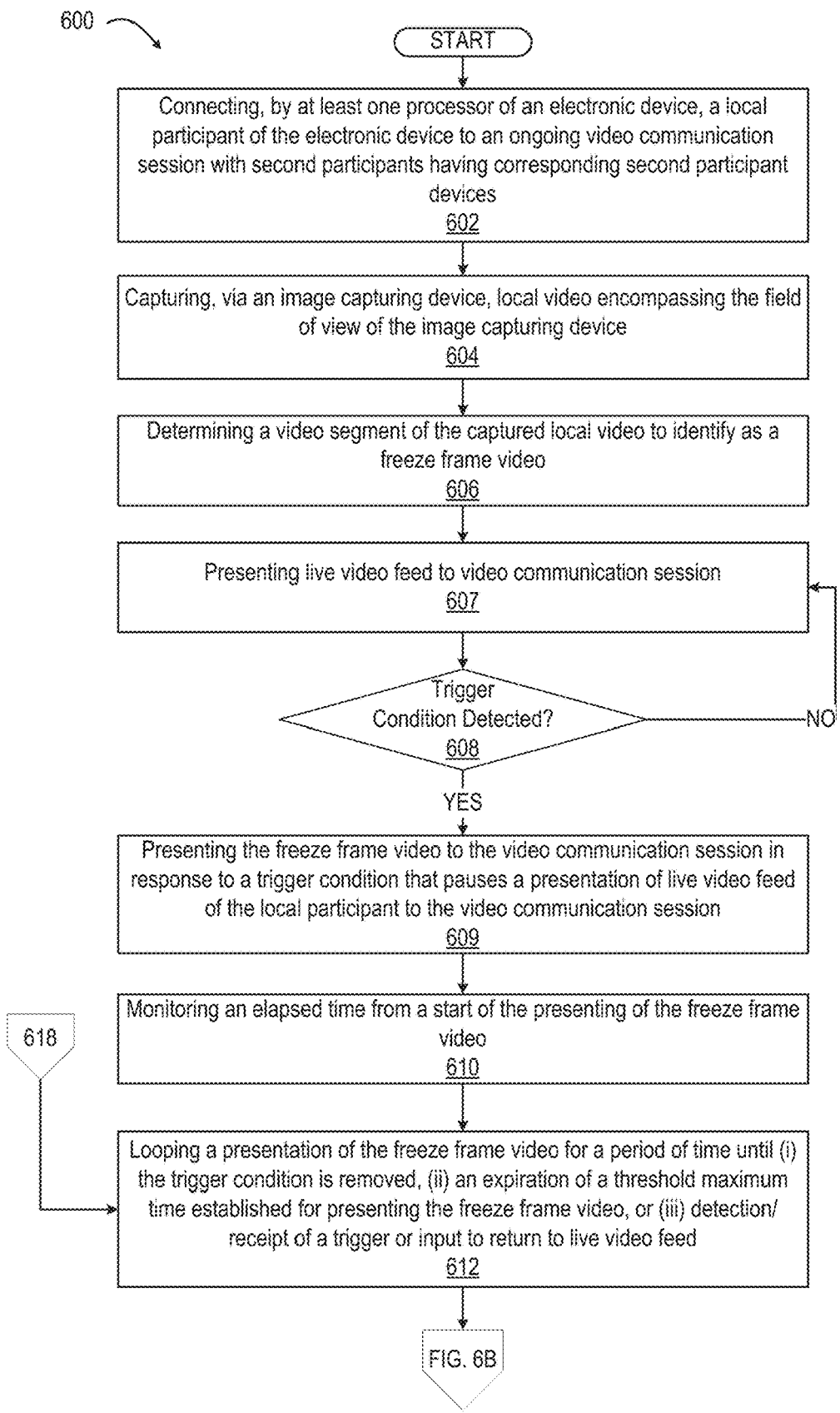
FIGS. 6A-6B (collectively FIG. 6) depict a flowchart of a method by which an electronic device selects a video segment as a freeze frame video and presents that video segment in response to a trigger condition, according to one or more embodiments.
Figure 6B:
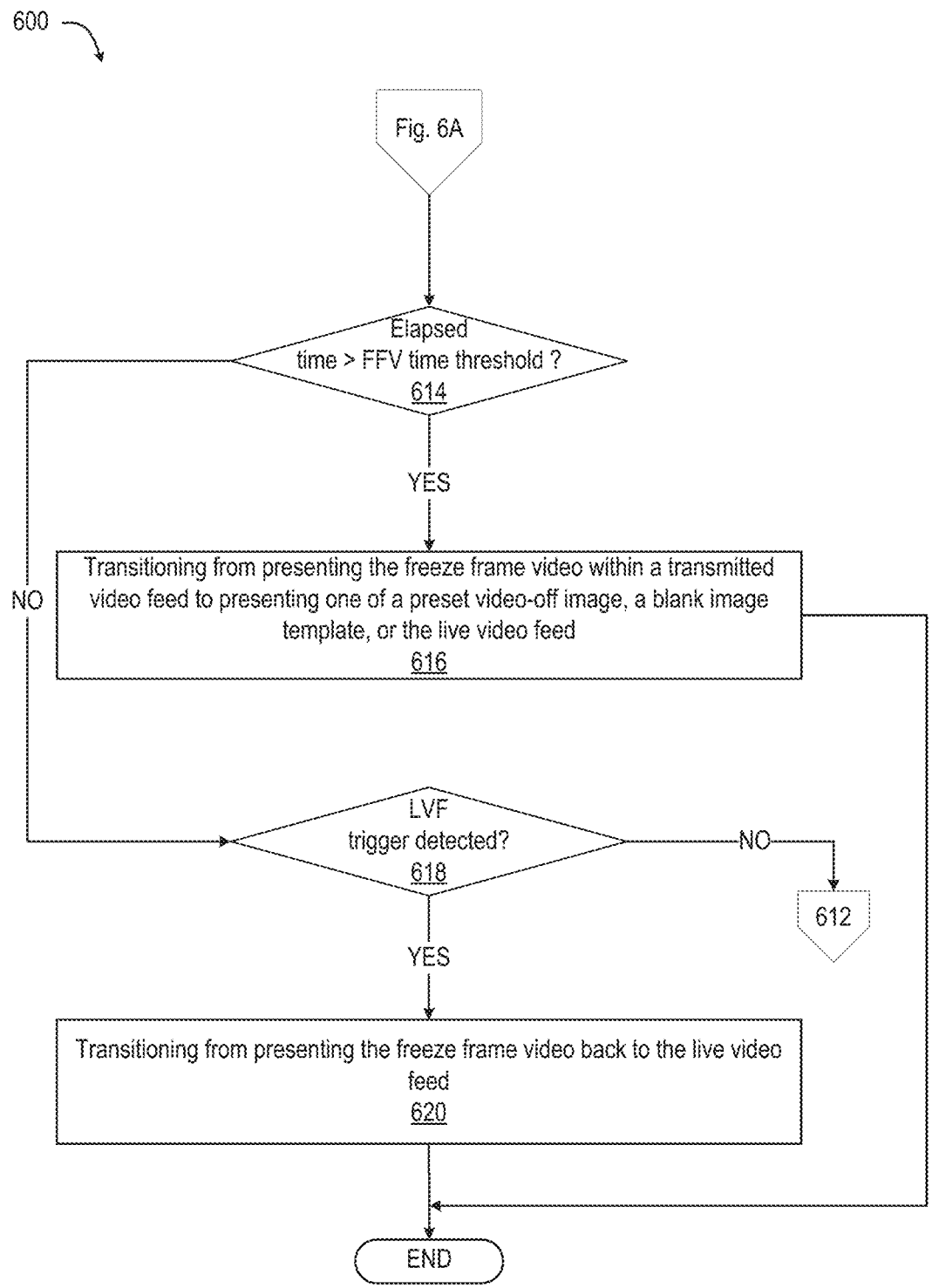

FIGS. 6A-6B (collectively FIG. 6) depict a flowchart of a method by which an electronic device selects a video segment as a freeze frame video and presents that video segment as the freeze frame video in response to a trigger condition, according to one or more embodiments. The descriptions of the various methods presented herein are provided with general reference to the specific components illustrated within the preceding figures. Specific components referenced in method 600 may be identical or similar to components of the same name used in describing the preceding figures. The described features can be provided by the AI engine and/or the processor, in alternate embodiments. Aspects of the method 600 are described as being performed by the processor of electronic device 110, which device is communicatively connected to VCS server and second participants' devices. The description of method 600 is thus presented from the perspective of the electronic device 110 and/or processor 202 (FIG. 2) making reference to the described devices, components, and features in the preceding FIGS. 1-5.

Method 600 begins at the start block and proceeds to block 602 at which method includes connecting, by at least one processor of an electronic device, a local participant of the electronic device to an ongoing video communication session with second participants having corresponding second participant devices. Method 600 includes capturing, via an image capturing device, local video encompassing a field of view of the image capturing device (block 604). In one or more embodiments, the field of view includes the local participant. In yet another embodiment, an AI processes the video and generates a freeze frame video only when there is a local participant present within the live video feed. Method 600 includes determining a video segment of the local video to identify as a freeze frame video (block 606). Method 600 includes presenting the live video feed to the video communication session (block 607). Method 600 includes determining at decision block 608 if a trigger condition for switching from live video feed to a freeze frame video is detected. If no trigger condition is detected, method 600 continues to present the live video feed (while the video option of the VCS application is turned on).

Method 600 includes presenting the freeze frame video to the video communication session in response to detection of a trigger condition that results in or causes a pause of a presentation of live video feed of the local participant to the video communication session (block 609). Method 600 further includes monitoring an elapsed time from a start of the presenting of the freeze frame video (block 610). According to one embodiment, the method 600 initially includes establishing a threshold maximum amount of time for looping the particular freeze frame video. Method 600 also includes looping a presentation of the freeze frame video for a period of time until at least one of (i) the trigger condition is removed, (ii) an expiration of a threshold maximum time established for presenting the freeze frame video, or (iii) detection of a second trigger that re-activates transmission of the first video feed from the first participant device (block 612). From block 612, method transitions to FIG. 6B.

Referring now to FIG. 6B, from block 612 (of FIG. 6A), method proceeds to decision block 614 at which processor monitors the elapse time and checks whether the elapsed time is greater than a preset FFV time threshold. In response to the elapsed time reaching the FFV threshold maximum amount of time, method includes transitioning from presenting the freeze frame video within a transmitted video feed to presenting one of a preset video-off image, a blank image template, or the live video feed (block 614). In response to the elapsed time not exceeding the FFV time threshold, method 600 includes determining whether a live video feed (LVF) trigger has been detected (block 618). In response to not detecting the LVF trigger, method transitions back to block 612 to continue presenting the preset number of loops of the FFV. However, if a LVF trigger is detected, method 600 includes transitioning from presenting the freeze frame video back to the live video feed (block 620). This transition occurs in response to a second trigger from among a plurality of different triggers associated with presenting the live video feed. Then, method 600 ends, as indicated by the end block.

According to one or more embodiments, in determining whether to present the FFV, method 600 includes determining a number of second participants on the video communication session and comparing the number of second participants to a threshold number. Method 600 includes initiating the presenting of the freeze frame video in response to the number of second participants being above the threshold number.

According to one or more embodiments, in determining whether to present FFV, method 600 includes identifying whether the local participant is not currently presenting on and not scheduled to present on, or to become a focus of, the video communication session. Method 600 incudes determining whether a current video focus of the video communication session is at least one of (i) presenting local video of and (ii) presenting content associated with at least one second participant, wherein the first video feed of the local participant is not currently in focus. Method 600 includes initiating the presenting of the first freeze frame video in response to the first video feed of the local participant not being currently in focus. Method 600 also includes initiating the presenting of the first freeze frame video further in response to identifying that the local participant is not currently presenting on and not scheduled to present on, or become the focus of, the video communication session.

Figure 7:
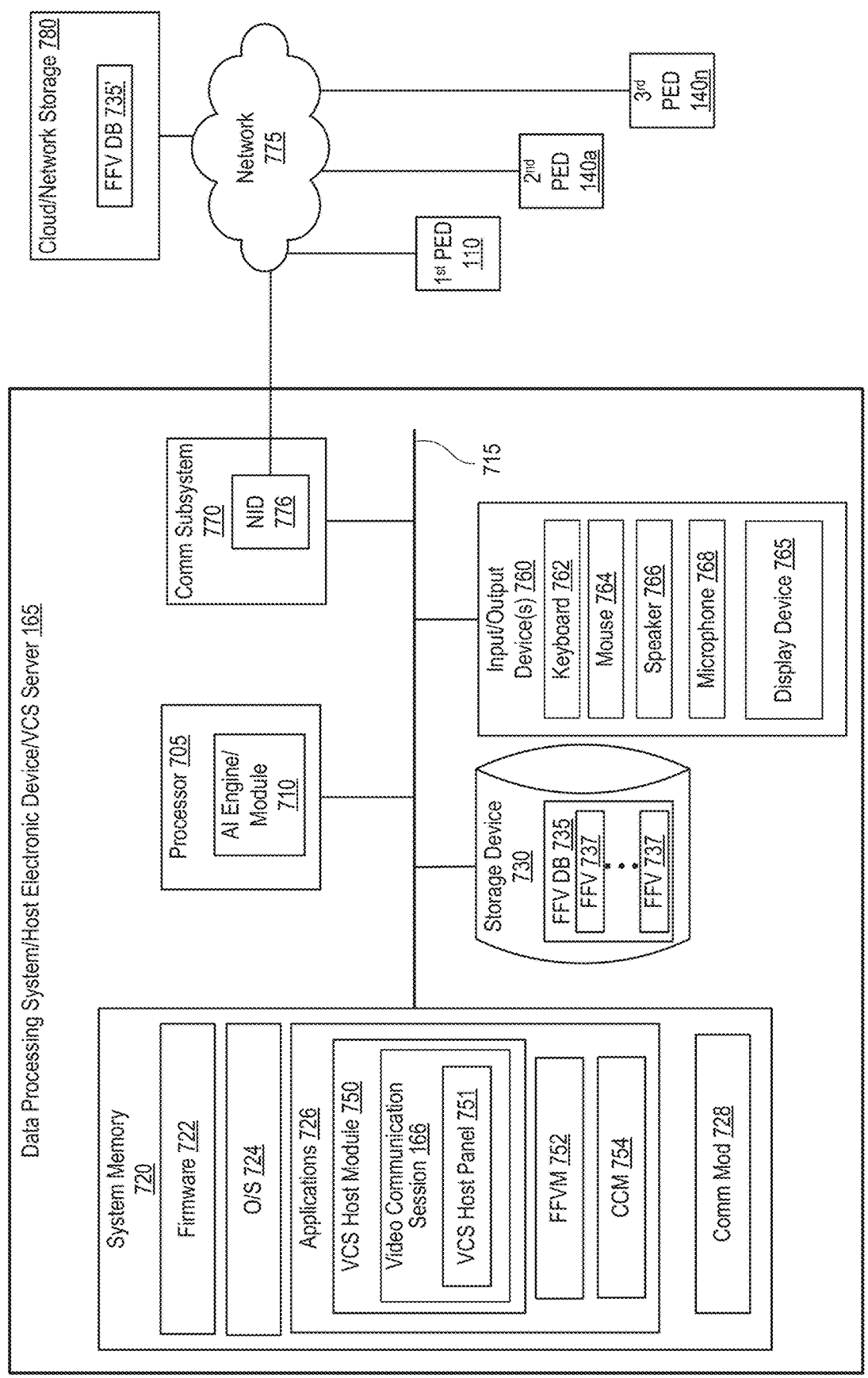
FIG. 7 provides a block diagram representation of an example data processing system than can operate as a video communication session (VCS) server and which includes artificial intelligence (AI) for generating and/or presenting freeze frame videos to a video communication session hosted by the VCS server, according to one or more embodiments.

According to another aspect of the disclosure, the presentation of the FFV and other FFV features are provided by a VCS host server. FIG. 7 provides a block diagram representation of an example data processing system than can operate as a video communication session (VCS) server. VCS server 135 includes artificial intelligence (AI) for generating and/or presenting freeze frame videos to a video communication session hosted by the VCS server, according to one or more embodiments. Because of its function as a host of the video communication session, VCS server 135 is interchangeably referred to herein as host electronic device 135 and/or VCS host server 135. Examples devices that operate and/or are configures as VCS server 135 can include, but are not limited to, a desktop computer, a laptop, a distributed networked system of devices, a virtual server, a cloud computing resource, etc.

VCS server 135 is an electronic device that includes system memory 720 having stored thereon a video communication session host module 750 and a freeze frame video support module 752 that collectively enables the electronic device 135 to operate as a video communication session host with freeze frame video presentation capabilities. System memory 720 may be a combination of volatile and non-volatile memory, such as random access memory (RAM) and read-only memory (ROM). System memory 720 can store program instructions/code and data associated with firmware 722, an operating system 724, applications 726, and communication module 728. Communication module 728 includes program code that is executed by processor 705 to enable VCS server 135 to communicate with other devices and systems. Processor 705 loads and executes program code stored in system memory 720. Examples of program code that may be loaded and executed by processor 705 include program code associated with applications 726 and program code associated with communication module 728. Although depicted as being separate from applications 726, communication module 728 may also be included within applications. Also, while shown as a separate module from VCS host module 750, FFVM 752 can be integrated within VCS host module 750 as one or more sub-routines or code segments, for example.

VCS server 135 includes a communication subsystem 770 that enables the device to communicatively connect, via a network 775, with a plurality of participant devices, including a first participant device 110 and a plurality of second participant devices 140 to a video communication session 136 hosted by the electronic device. VCS server 135 includes communication module (or firmware) 728 to facilitate and/or manage communication subsystem 770 completing connections with and communicating with external networks and devices. VCS server 135 can be in communication, via network interface device (NID) 776, with one or more networks, generally represented as network 775. Network 775 can be or can include a variety of networks such as a local area network, a wide area network, a wireless network or the Internet.

VCS server 135 also includes a processor 705 communicatively connected to the communication subsystem 770 and the memory 720 via a system interconnect 715. System interconnect 715 communicatively couples the various components and sub-components of VCS server 135 to each other and in particular to processor 705 and system memory 720. The processor 710 processes code from the video communication session host module 750 and the freeze frame video support module 752 to enable the VCS server 135 to perform a series of processes as describer hereafter. The VCS server 135 establishes the video communication session between the first participant device 110 and more than one second participant devices (140) among the plurality of second participant devices 140 via CCM 754. The VCS server 135 receives, from the first participant device 110, a first video feed of a first participant to the video communication session 136. In response to a trigger condition, VCS server 135 temporarily presents to the video communication session a first freeze frame video of the first participant in place of the first video feed to represent video content from the first participant device.

To enable and/or support some of the other functions that can be performed by VCS server 135, VCS server 135 includes storage device 730, within which VCS server 135 stores a local FFV database (DB) 735 with FFVs 737 for one or more of the participants that have server-level FFV functionality activated. In one embodiment, FFV DB 735 is stored externally to VCS server 135. In the illustrated embodiment, FFV DB 735 or a network-stored copy of FFV DB 735' is maintained at cloud/network storage 780. VCS server 135 can also include one or more input/output devices 760, enabling human interfacing with VCS server 135. I/O devices can include keyboard 762, mouse or pointing device 764, speaker 766, and microphone 768. I/O devices can further include display device 765, enabling graphical user interfacing with a host panel 751 that can be generated for the VCS 166.

Figure 8:
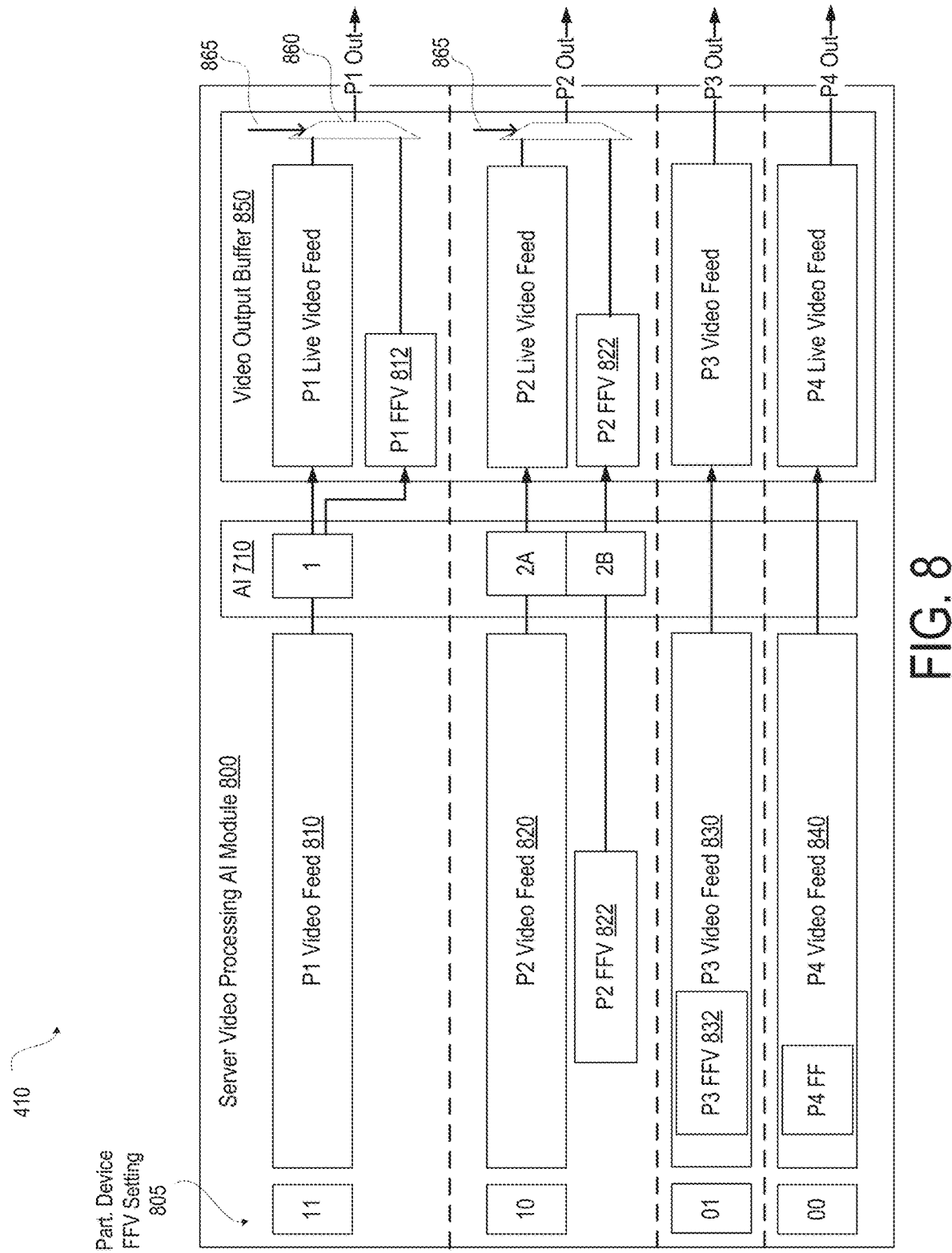
FIG. 8 illustrates example operations of the AI module of VCS server receiving and processing live video feed to generate and buffer freeze frame videos and selectively output freeze frame videos to a video communication session based on contextual triggers, in accordance with multiple embodiments.

FIG. 8 illustrates example operations of the AI engine 710 of VCS server 135 processing multiple live video feeds received from different participant devices, to generate and buffer freeze frame videos and to selectively output freeze frame videos to a video communication session based on contextual triggers, in accordance with multiple embodiments. Aspects of FIG. 8 illustrates AI processing of received video feeds (810, 820, 830, 840) within VCS server 165 to support freeze frame generation and presenting functionality for a plurality of connected participant devices (P1-P4) to a video communication session, in accordance with multiple embodiments. AI module 800 receives a video feed from four participant devices, P1-P4, respectively representing four participants P1-P4 of VCS. Each of multiple participant devices processes a local VCS application that provides a device FFV setting parameter 805. FFV setting parameter 805 has a corresponding FFV value corresponding to a setting value of the FFV setting parameter 805 from among host server FFV generation and presentation (11), local FFV generation, with host server presentation (10), local device FFV processing (01), and FFV off (00).

First participant has FFV setting value of 11, which can be transmitted as embedded code in a heading of P1 video feed 810 and received by AI 710. AI 710 interprets the FFV setting value of 11 as indicating that AI 710 is being required to generate the FFV for P1. AI thus transmits P1 live video feed 810 via video output buffer 850 to communication session. From P1 video feed 810, AI 710 generates P1 FFV 812, and AI 710 buffers or stores P1 FFV 812 for detection of a trigger that activates presentation of the P1 FFV 812. P2 device has FFV setting value of 10, indicating that P2 device generates the FFV locally, but sends the locally-generated P2 FFV 822 to the server, where AI 710 determines when a condition occurs that requires AI 710 to selectively transmit only one of the P2 video feed 820 or the P2 FFV 822 to other participants.

P3 device has FFV setting value of 01, which indicates that the P3 FFV 832 is being generated at the local P3 device and transmitted by the local P3 device. In this scenario, AI 710 simply presents what is being communicated to VCS server from P3 as the P3 output to the other participants. P4 device has not turned on FFV functionality or does not support FFV functionality. This is identified by the FFV settings value of 00. Thus, freeze frames (e.g., still images) and other glitches that occur with video transmission at P4 are simply communicated, as is, to the other participants.

AI 710 processes the received videos based on the device setting values received from the respective devices. AI 710 controls an video output buffer to present a selected one of the received live video feed or, where appropriate, a selected FFV, to the other participant devices connected to the VCS. Where AI 710 maintains and controls the presentation of the particular FFV, a trigger condition is analyzed or received at AI 720 to cause AI 710 to select the FFV as the feed from that participant over the live video feed of the participant. In the illustrative embodiment, a MUX 860 receives both video inputs and AI 710 provides a specific value of MUX selector input 865, in selecting which of the two video feeds is presented as the video output for the participant device.

Referring again to FIG. 7, with continued reference to FIG. 8, according to one embodiment, the processor 705 receives, via the communication subsystem 770, the first freeze frame video from the first participant device, and processor 705 associates the first freeze frame video with the first participant device in a freeze frame mapping resource (e.g., FFV DB 735). The processor 705 retrieves and presents the first freeze frame video in response to detection of at least one trigger condition from among a group that includes: a loss of a video feed signal from the first participant device; a noticeable degradation in quality of a presentation of the first video feed; detection of a static freeze frame in locally captured video feed received from the first participant device; and detection of a specific condition occurring within the video feed of the first participant device. According to one or more embodiments, the condition is one from among a group that includes a facial expression, a gesture, a movement, a local ambient condition, and background activity occurring in a field of view of an image capturing device of the first participant device.

Activation of server-level freeze frame functionality can be triggered by input received from the participant device, in one or more embodiments, or can be a default setting, in one or more alternate embodiments. According to the embodiments involving a trigger from the participant device, the processor 705 receives notification of an input at the first participant device that turns on contextual freeze frame video functionality of a video communication application of the first participant device. In response to receiving the notification, the processor 705 monitors the received first video feed for detection of one or more of a gesture or a facial expression or other trigger that corresponds to (an activation input) initiating a presentation of the first freeze frame video. The processor 705 initiates the presenting of the freeze frame video in response to detection of the activation input.

The processor 705 loops the presentation of the video segment for a period of time until at least one of (i) removal of the trigger condition, (ii) expiration of a threshold maximum amount of time for the presentation of the first freeze frame video, or (iii) detection of a trigger that re-activates transmission of the first video feed from the first participant device. According to one or more embodiments, the processor 705 establishes the threshold maximum amount of time for looping the FFV, monitors an elapsed time since a start of the presenting of the FFV, and transitions from presenting the freeze frame video as the first video feed to presenting one of a preset video-off image, a blank image template, or the first video feed, in response to the elapsed time reaching the threshold maximum amount of time. The processor 705 also transitions from presenting the freeze frame video back to presenting the first video feed in response to a second trigger from among a plurality of different triggers associated with initiating the presenting of the first video feed. According to one or more embodiments, in establishing the threshold maximum amount of time, the processor 705 identifies a context of each trigger condition from among a plurality of different contexts, each context providing at least a different one of a preselected video segment of received first video feed (i.e., the FFV) and a corresponding threshold amount of video loop presentation time assigned. The processor 705 selects and applies the corresponding preselected video segment as the FFV and the threshold amount of video loop presentation time, based on the identified context.

In one or more embodiment, prior to enabling FFV functionality, the processor 705 determines a number of second participants participating in the video communication session, compares the number of second participants to a threshold number, and initiates the presenting of the first freeze frame video in response to the number of second participants being above the threshold number. The processor 705 further identifies that the first participant is not currently presenting on and not scheduled to present on, or to become a focus of, the video communication session. And, the processor 705 initiates the presenting of the first freeze frame video further in response to identifying that the first participant not currently presenting on and not scheduled to present on, or become the focus of, the video communication session.

In one or more embodiment, prior to enabling FFV functionality for a particular participant, the processor determines that a current video focus of the video communication session is at least one of (i) presenting local video of and (ii) presenting content associated with at least one second participant, where the first video feed of the first participant is not currently in focus. And, the processor 705 initiates the presenting of the first freeze frame video in response to the first video feed of the first participant not being currently in focus.

In generating the FFV, the processor 705 determines a video segment of the received first video feed to identify as the first freeze frame video, the video segment presenting the first participant as attentive to the video communication session. The processor 705 generates the first freeze frame video from the video segment and stores the first freeze frame video within a server repository (e.g., FFV DB 735). According to one or more embodiments, in determining a video segment of the received first video feed to identify as the first freeze frame video, the processor receives and buffers the first video feed and analyzes the first video feed for contextual information that correlates to an action or inaction to be performed by the first participant that requires a current video of the first participant to be temporary removed from being fed to other participants of the video communication session. The processor 705 selects a specific freeze frame video start point and determines a length of the video segment, based on the contextual information.

According to one or more embodiments, in generating the first freeze frame video, the processor transmits, to the first participant device, at least one prompt that is outputted via an output device of the first participant device, the at least one prompt requesting the first participant to prepare for capturing of local video to generate the freeze frame video. The processor 705 selects, via an artificial intelligence 710, a specific sequence of a video feed from among a longer sequence of the first video feed, the specific sequence of video feed presenting the first participant being attentive to the video communication session.

Figure 9:
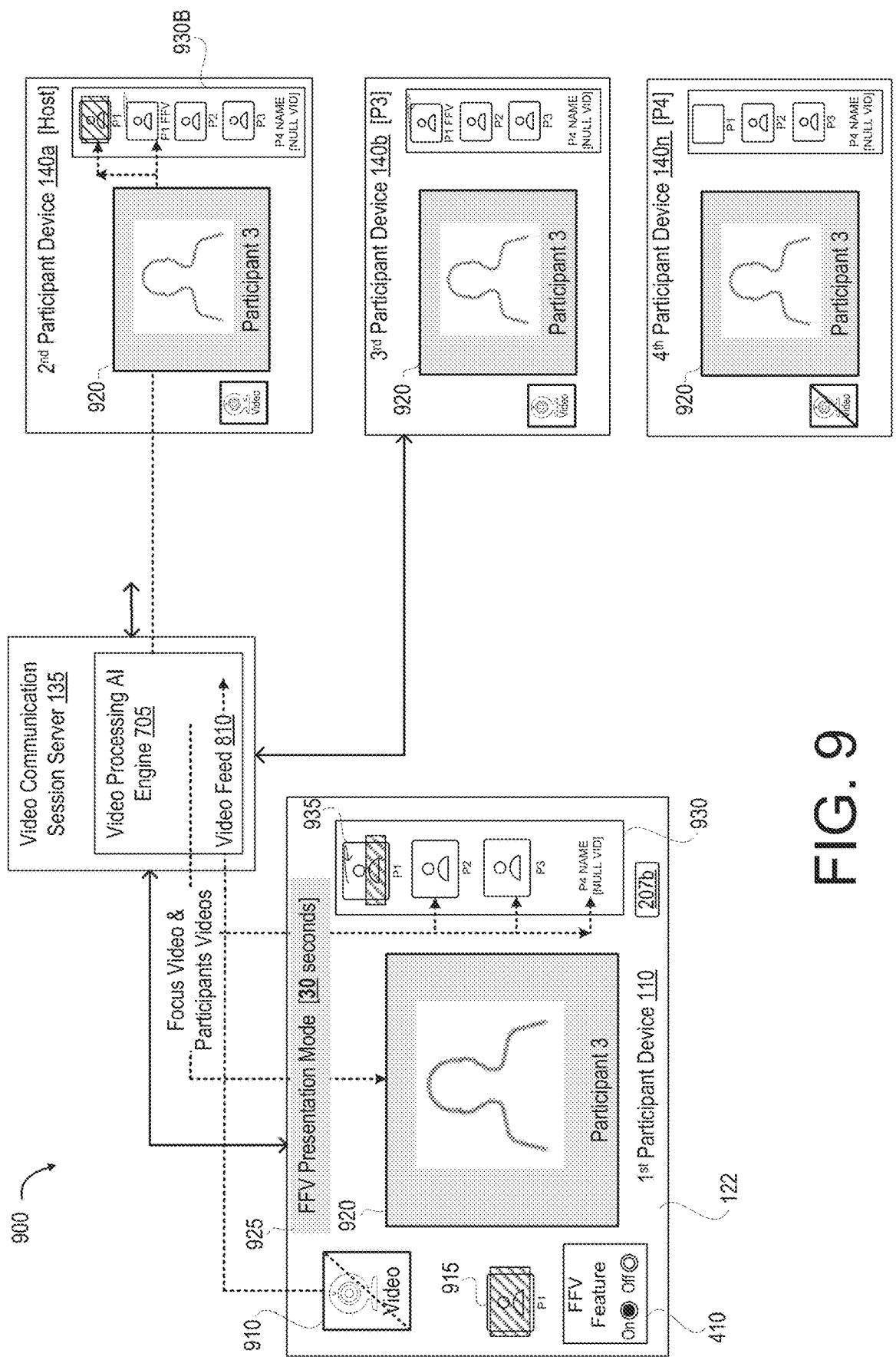
FIG. 9 provides an example illustration of a granular application of freeze frame video presentation by the AI to various different second participants connected to a VCS, where only select participants receive the freeze frame video, in accordance with multiple embodiments.

FIG. 9 provides an example illustration of a granular application of freeze frame video presentation by the AI 710 to different second participants connected to a VCS, where only select participants receive the freeze frame video, in accordance with multiple embodiments. Accordingly, with these embodiments, freeze frame video functions are assigned granularly to different participant devices in a multiple participant VCS, such that only select participants receive the freeze frame video of a first participant. FIG. 9 is described with ongoing reference to the preceding figures. In the illustrated embodiment of granular FFV exchange 900, four participant devices, PD1 110, PD2 140*a*, PD3 140*n*, and PD4 140*b* are communicatively connected to a VCS via a VCS server 135, which includes AI engine 710. AI engine 710 provides a primary video 920 and received participant videos to each participant device. Primary video 440 can be received from VCS server 135 or can be a video originating at first participant device 110 and shared with other participants via VCS. Received participant videos are presented within participants widow 930 and includes a FFV video 935 of first participant that is being looped.

First participant device 110 has VCA UI 122 within which FFV capture feature 410 (see FIG. 4) is set to "on" for local or server level FFV generation and/or presentation. In one or more embodiments, virtual button 207*b* is provided within the VCA UI 122 to enable manual selection (e.g., via the participants finger or a pointing device) to initiate FFV presentation when desired by the local participant. The display device of first participant device 110 displays a primary video 440 that is the current video in focus for the VCS. First participant device 110 also has its local video on, but in FFV presentation mode (as indicated by the dashed line across the video icon). According to the illustrative embodiment, while in FFV presentation mode, processor 202 generates an on-screen FFV notification 925 to the participant of the FFV status and time remaining before the FFV presentation ends and the device returns to presenting a live video feed. Each participant device 110, 140*a*, 140*b*, 140*n* has a participant window 446 in which a video feed of each connected participant is presented. As shown, first participant video preview 915) is in FFV presentation mode, with the local video turned off (indicated by the dashed diagonal line across the video icon 910. It is appreciated that in some embodiments, where the VCS server controls the presentation of FFV of first participant device, first participant video preview 915 can actually be "frozen", such that the signal being received is below a preset quality threshold, triggering the VCS server to implement FFV functions for first participant device 110. When in FFV presentation mode, versus being actually frozen due to a communications issue, the local ICD is still capturing local video to allow the processor to detect gestures and/or other visual triggers that can cause the first device to exit the FFV presentation mode earlier than the maximum time established for FFV presentation.

According to the illustrative embodiment, second participant device 140*a* is, or operates as, a host device that facilitates the VCS. VCS server 135 forwards the received live video and/or the frozen state of the received live video feed as well as the FFV of the first participant device to second participant device 140*a*. Accordingly, second participant device 140*a* presents both views within its locally presented participants window 930B. As a host device, the second participant (i.e., the host) can assess whether the first participant is ready to provide live video feed to the VCS, for example, by being back at his/her seat after leaving for coffee, etc. The host can utilize this information in knowing which participant to queue for presentation to the VCS.

Third participant device 140*n* is provided only the FFV feed, which is looped until the end of the preset maximum time, before being replaced with a still image or null video or the live video received from VCS server 135. Fourth participant device 140*b* receives only a still image or null video, as determined based on a preset status assigned to the fourth participant, as not receiving a FFV. With this embodiment, the processor 202 or AI individually determines which second participant devices are selected to receive a FFV from the first participant device 110.

Figure 10A:
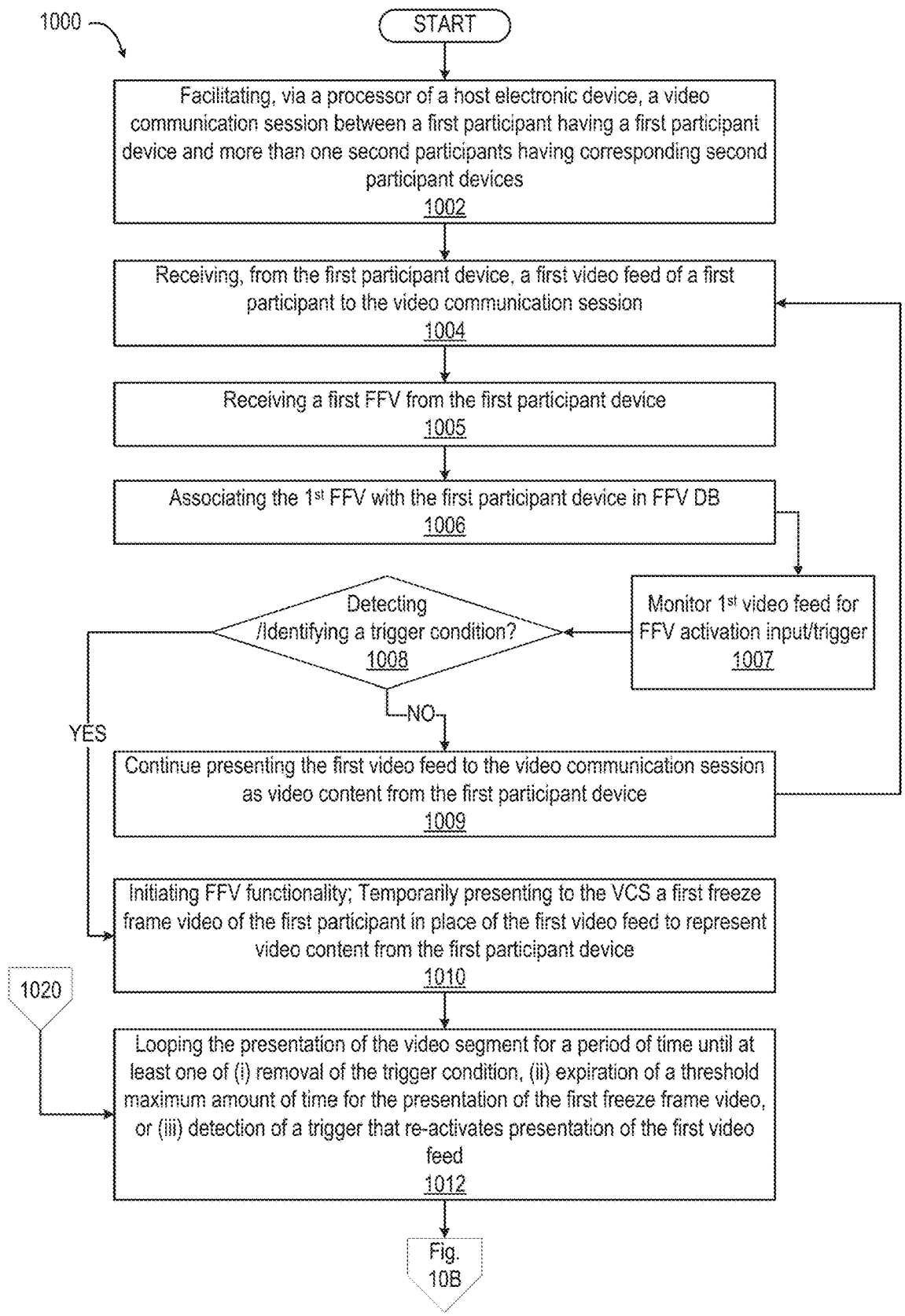
FIGS. 10A-10B (FIG. 10) depicts a flowchart of a method by which a VCS server receives and selectively presents a freeze frame video for a first participant device during a video communication session, according to one or more embodiments.
Figure 10B:
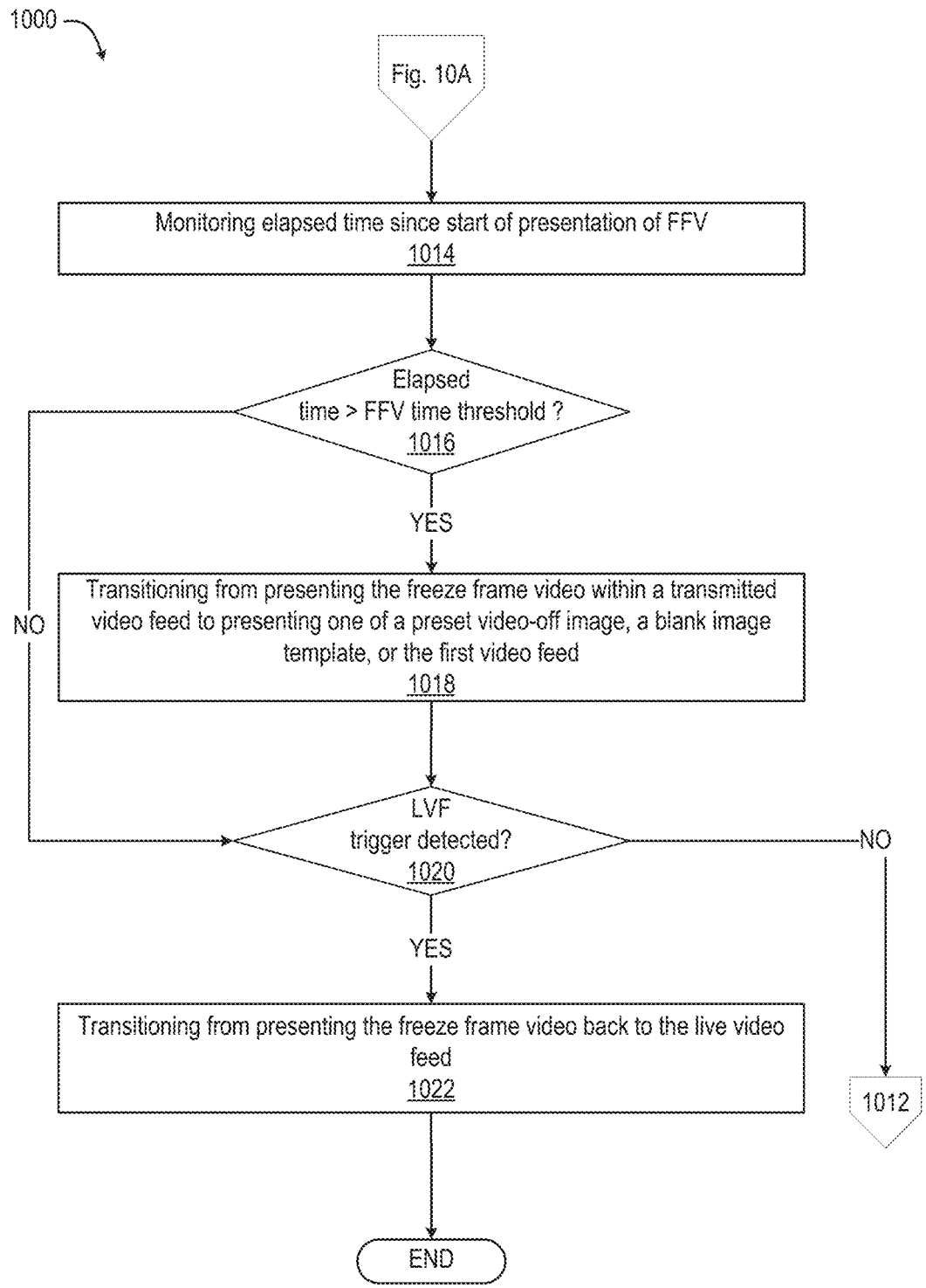
Figure 11:
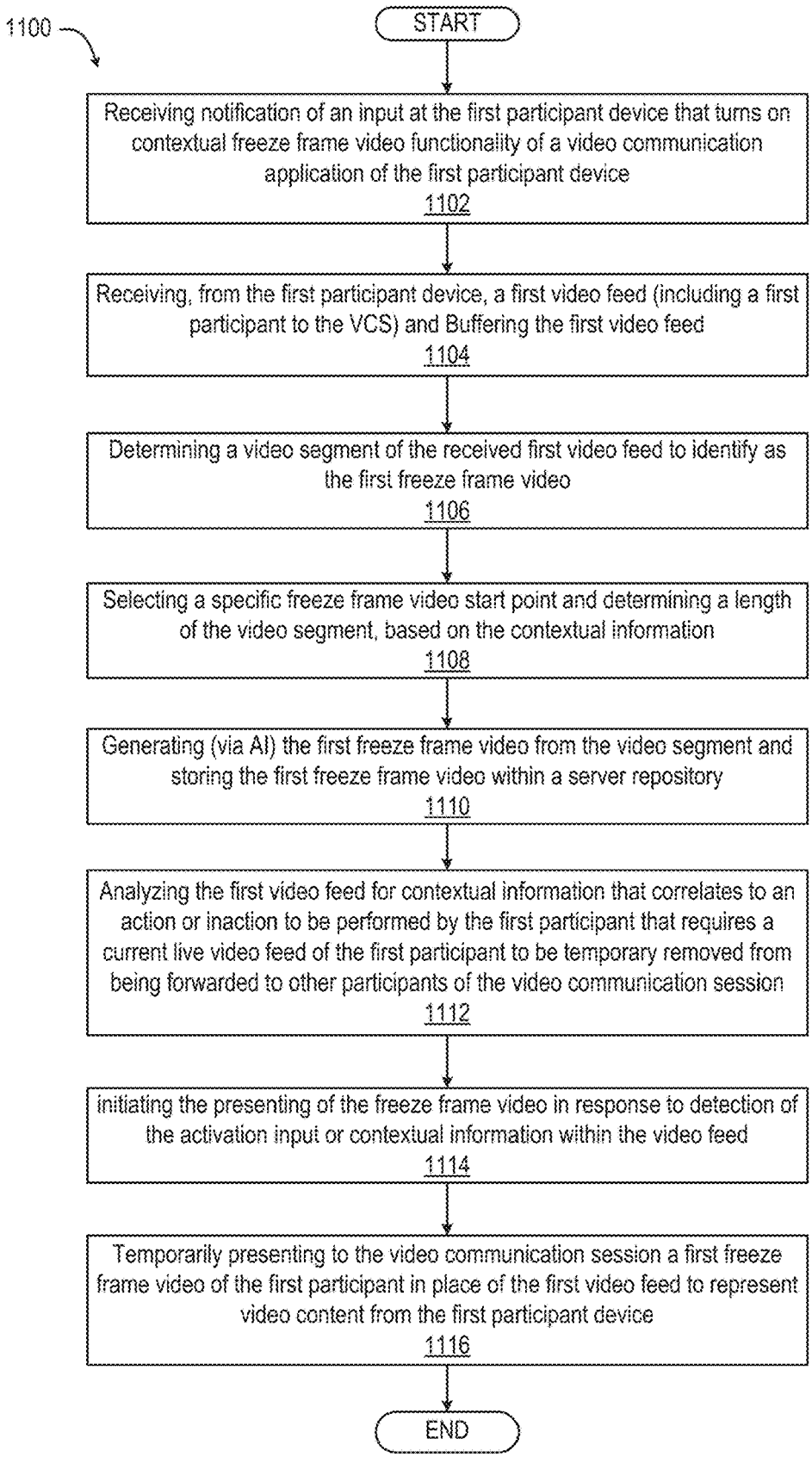
FIG. 11 depicts a flowchart of a method by which the VCS server generates freeze frame videos from a received live video stream and presents the generated freeze frame video to a video communication session based on contextual information detected within the live video stream, according to one or more embodiments.

FIGS. 10A-10B (FIG. 10) depict a flowchart of a method by which a VCS server receives and selectively presents a freeze frame video for a first participant device during a video communication session, according to one or more embodiments. FIG. 11 depicts a flowchart of a method by which the VCS server generates freeze frame videos from a received live video stream and presents the generated freeze frame video to a video communication session based on contextual information detected within the live video stream, according to one or more embodiments. The descriptions of the various methods presented herein are provided with general reference to the specific components illustrated within the preceding figures. Specific components referenced in methods 1000, 1100 may be identical or similar to components of the same name used in describing the preceding figures. In one or more embodiments, the features of method 1000 and the other methods described herein can be provided by processor 705 of VCS server 135 operating on program instructions from the various modules and applications presented in FIGS. 3 and 7. It is appreciated that certain of the described features of methods 1000, 1100 may be completed by AI engine/module 710. However, these features are all generally described as being performed by processor 705 for simplicity.

Referring now to FIG. 10, beginning after the start block, method 1000 includes facilitating, via a processor of an electronic device, a video communication session between a first participant having a first participant device and more than one second participants having corresponding second participant devices (block 1002). Method 1000 includes receiving, from the first participant device, a first video feed of a first participant to the video communication session (block 1004). In a first embodiment in which the FFV is generated at the first participant's device, method 1000 also includes receiving, via a communication subsystem of the host electronic device, the first freeze frame video from the first participant device (block 1005). Method 1000 includes associating the first freeze frame video with the first participant device in a freeze frame mapping resource or (e.g., a FFV database) (block 1006).

Method 1000 includes monitoring the received first video feed for detection of one or more of a gesture or a facial expression that corresponds to an activation input for initiating a presentation of the first freeze frame video (block 1007). Method 1000 includes determining at decision block 1008 whether a trigger condition is detected or identified to activate and/or implement freeze frame presentation functions for the first participant device. In response to not detecting/identifying a trigger condition, method 1000 includes continuing to present the first video feed to the live communication session as the video content from the first participant device (block 1009). Method 1000 then returns to block 1004.

Method 1000 includes, in response to detecting/identifying a trigger condition (activation input), initiating the presenting of the freeze frame video and temporarily presenting to the video communication session a first freeze frame video of the first participant in place of the first video feed to represent video content from the first participant device (block 1010). According to one or more embodiments, as a part of detecting/identifying the trigger condition, method 1000 includes retrieving and presenting the first freeze frame video in response to detection of at least one trigger condition from among a group that includes: a loss of a video feed signal from the electronic device; a noticeable degradation in quality of a presentation of the first video feed; detection of a static freeze frame in locally captured video feed received from the first participant device; and detection of a specific condition occurring within the video feed of the first participant device. According to one or more embodiments, the specific condition is one from among a group that includes a facial expression, a gesture, a movement, a local ambient condition, and background activity occurring in a field of view of an image capturing device of the first participant device.

According to one or more embodiments, method 1000 includes establishing a threshold maximum amount of time for looping the FFV video. The threshold maximum time can be a time value communicated to the VCS server from the first participant device along with the FFV or can be a time value established by the AI of the VCS server, in alternate embodiments. Method 1000 includes looping the presentation of the video segment for a period of time until at least one of (i) removal of the trigger condition, (ii) expiration of a threshold maximum amount of time for the presentation of the first freeze frame video or (iii) detection of a trigger that re-activates presentation of the first video feed (block 1012).

From block 1012, method 1000 transitions to FIG. 10B. Method 1000 includes monitoring an elapsed time since a start of the presenting of the FFV (block 1014) and determining at decision block 1016 if the elapsed time is greater than a time threshold. In response to the elapsed time reaching the threshold maximum amount of time, method includes transitioning from presenting the freeze frame video within a transmitted video feed to presenting one of a preset video-off image, a blank image template, or the first video feed (block 1018). Following and/or in response to the elapsed time not exceeding the FFV time threshold, method 1000 includes determining whether a live video feed (LVF) trigger has been detected (block 1020). The LVF trigger is a second trigger from among a plurality of different triggers that causes the VCS server to present the live video feed from the first participant's device. In response to not detecting the LVF trigger, method transitions back to block 1012 to continue to loop through presentation of the FFV. However, if a LVF trigger is detected, method 1000 includes transitioning from presenting the freeze frame video back to the live video feed (block 1022). Then, method 1000 ends, as indicated by the end block.

Referring now to FIG. 11, following the start block, method 1100 includes receiving notification of an input at the first participant device that turns on contextual freeze frame video functionality of a video communication application of the first participant device (block 1102). Method 1100 includes, in response to receiving the notification, receiving and buffering the first video feed (block 1104). Method 1100 includes determining a video segment of the received first video feed to identify as the first freeze frame video (block 1106).

In one or more embodiments, the video segment is determined by the AI as a segment presenting the first participant as attentive to the video communication session. Accordingly, in one or more embodiments, in generating the first freeze frame video, method 1100 includes transmitting, to the first participant device, at least one prompt that is outputted via an output device of the first participant device, the at least one prompt requesting the first participant to prepare for capturing of local video to use in generating the freeze frame video. Method 1100 then includes selecting, via an artificial intelligence, a specific sequence of a video feed from among a longer sequence of the first video feed, the specific sequence of video feed presenting the first participant being attentive to the video communication session.

Referring back to the flow chart, method 1100 includes selecting a specific freeze frame video start point and determining a length of the video segment, in part based on contextual information (block 1108). Method 1100 includes generating the first freeze frame video from the video segment and storing the first freeze frame video within a server repository (FFV DB) (block 1110).

Method 1100 includes analyzing the first video feed for an activation input of contextual information that correlates to an action or inaction to be performed by the first participant that requires a current live video feed of the first participant to be temporarily removed from being forwarded to other participants of the video communication session (block 1112). Method 1100 includes initiating the presenting of the freeze frame video in response to detection of the activation input or contextual information within the video feed (block 1114). Method 1100 includes temporarily presenting to the video communication session a first freeze frame video of the first participant in place of the first video feed to represent video content from the first participant device (block 1116). Method 1100 then ends.

According to one or more aspects of the disclosure, different device conditions can be identified as triggers for activating the freeze frame functions described herein. In one embodiment, the processor determines that the device has at least one camera and is in active communication with at least one second electronic device remotely connected via a video conference call. As an optional step, the processor may determine that the first electronic device is docked or kept in a stationary position. As another optional step, the processor can further determine that the first device is being used in a ready for video conference context while connected as a webcam to at least a second display device (e.g., a monitor, a TV or a PC). Additional conditions can include the processor determining that at least one of the following aspects are enabled in the video call: (i) the number of participants is larger than a threshold number (e.g., 5 or more participants); or (ii) one of the second participants is currently at focus or sharing or demonstrating within the video call interface. Examples of the second condition include (i) the second participants device screen can be placed within the prominent display area of the video communication session; (ii) the second participant is presenting a performance e.g., playing guitar; (iii) a second participant is the main speaker at a particular point in time of call, while other participants are the audience. A pre-requisite condition can be that the user has enabled contextual freeze frame functionality.

According to the described embodiments, a method of freeze frame video presentation is applied by creating a video sample and automatically selecting an optimized loop sequence of the user in the present video feed. The created video sample takes into account the current video settings and the scene, including the background replacement function if that function is enabled by the user. This video sample would be considered as a professional or animated freeze frame to be utilized during the video communication session. Additionally, according to one or more embodiments, the animated sequence can be auto-selected, auto-stopped and/or auto-started based on facial expression or gestures of the local user. The disclosure thus enables capture of an optimized loop sequence of the user in the present video feed which can be auto-selected, auto-stopped and auto-started, based on facial expression or gestures of the user during the video call.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regard to the sequence of operations without departing from the spirit or scope of the present disclosure. Use of a particular sequence is, therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
a memory having stored thereon a video communication session host module and a freeze frame video support module that collectively enables the electronic device to operate as a video communication session host with freeze frame video presentation capabilities;
a communication subsystem that enables the electronic device to communicatively connect with a plurality of participant devices, including a first participant device and a plurality of second participant devices to a video communication session hosted by the electronic device; and
a processor communicatively connected to the communication subsystem and the memory and which processes code from the video communication session host module and the freeze frame video support module, wherein the processor is configured to cause the electronic device to:
establish the video communication session between the first participant device and more than one second participant devices among the plurality of second participant devices;
receive, from the first participant device, a first live video feed of a first participant to the video communication session;
associate a first freeze frame video with the first participant device in a freeze frame mapping resource, the first freeze frame video being a video segment recorded from the first live video feed and stored within a server repository; and
in response to identifying a trigger condition that is pre-identified to cause the electronic device to implement freeze frame presentation functions for the first participant device and present, to the video communication session, the freeze frame video in place of the live video stream of the first participant, temporarily present to the video communication session the first freeze frame video of the first participant device in place of the first video feed to represent video content from the first participant device, the first freeze frame video being recorded prior to detection of the pre-identified trigger.

2. The electronic device of claim 1, wherein the processor:
receives, via the communication subsystem, the first freeze frame video from the first participant device;
associates the first freeze frame video with the first participant device in a freeze frame mapping resource; and
retrieves and presents the first freeze frame video in response to detection of at least one trigger condition from among a group comprising:
a loss of a video feed signal from the electronic device;
a noticeable degradation in quality of a presentation of the first video feed;
detection of a static freeze frame in locally captured video feed received from the first participant device; and
detection of a specific condition occurring within the first video feed of the first participant device, the specific condition being one from among a group comprising a facial expression, a gesture, a movement, a local ambient condition, and background activity occurring in a field of view of an image capturing device of the first participant device.

3. The electronic device of claim 1, wherein the processor further:
receives notification of an input at the first participant device that turns on contextual freeze frame video functionality of a video communication application of the first participant device;
in response to receiving the notification, monitors the received first video feed for detection of one or more of a gesture or a facial expression that corresponds to an activation input for initiating a presentation of the first freeze frame video; and
initiates the presenting of the freeze frame video in response to detection of the activation input.

4. The electronic device of claim 1, wherein the processor loops the presentation of the freeze frame video for a period of time until at least one of (i) removal of the trigger condition, (ii) expiration of a threshold maximum amount of time for presentation of the first freeze frame video, or (iii) detection of a trigger that re-activates transmission of the first video feed from the first participant device.

5. The electronic device of claim 4, wherein the processor:
establishes the threshold maximum amount of time for looping the freeze frame video;
monitors an elapsed time since a start of the presenting of the segment;
transitions from presenting the freeze frame video as the first video feed to presenting one of a preset video-off image, a blank image template, or the first video feed, in response to the elapsed time reaching the threshold maximum amount of time; and
transitions from presenting the freeze frame video back to the first video feed in response to a second trigger from among a plurality of different triggers associated with presenting the first video feed.

6. The electronic device of claim 5, wherein in establishing the threshold maximum amount of time, the processor:
identifies a context of each trigger condition from among a plurality of different contexts, each context providing at least a different one of a preselected video segment of received first video feed and a corresponding threshold amount of video loop presentation time assigned; and
selects and applies a corresponding preselected video segment as the freeze frame video and a threshold amount of video loop presentation time based on the identified context.

7. The electronic device of claim 1, wherein the processor further:
   determines a number of second participants participating in the video communication session;
   compares the number of second participants to a threshold number; and
   initiates presenting of the first freeze frame video further in response to the number of second participants being above the threshold number.

8. The electronic device of claim 7, wherein the processor further:
   identifies that the first participant is not currently presenting on and not scheduled to present on or to become a focus of the video communication session; and
   initiates presenting of the first freeze frame video further in response to identifying that the first participant not currently presenting on and not scheduled to present on or become the focus of the video communication session.

9. The electronic device of claim 1, wherein the processor further:
   determines that a current video focus of the video communication session is at least one of (i) presenting local video of and (ii) presenting content associated with at least one second participant, wherein the first video feed of the first participant is not currently in focus; and
   initiates presenting of the first freeze frame video further in response to the first video feed of the first participant not being currently in focus.

10. The electronic device of claim 1, wherein the processor:
    determines a video segment of the first video feed to identify as the first freeze frame video, the video segment presenting the first participant as attentive to the video communication session;
    generates the first freeze frame video from the video segment; and
    stores the first freeze frame video within the server repository.

11. The electronic device of claim 10, wherein in determining a video segment of the first video feed to identify as the first freeze frame video, the processor:
    receives and buffers the first video feed;
    analyzes the first video feed for contextual information that correlates to an action or inaction to be performed by the first participant that requires a current video of the first participant to be temporary removed from being fed to other participants of the video communication session; and
    selects a specific freeze frame video start point and determines a length of the video segment, based on the contextual information.

12. The electronic device of claim 10, wherein in generating the first freeze frame video, the processor:
    transmits, to the first participant device, at least one prompt that is outputted via an output device of the first participant device, the at least one prompt requesting the first participant to prepare for capturing of local video to generate the freeze frame video; and
    selects, via an artificial intelligence, a specific sequence of video feed from among a longer sequence of the first video feed, the specific sequence of video feed presenting the first participant being attentive to the video communication session.

13. A method comprising:
    facilitating, via a processor of a host electronic device, a video communication session between a first participant having a first participant device and more than one second participants having second participant devices among a plurality of second participant devices;
    receiving, from the first participant device, a first live video feed of a first participant to the video communication session;
    associating a first freeze frame video with the first participant device in a freeze frame mapping resource, the first freeze frame video being a video segment recorded from the first live video feed and stored within a server repository; and
    in response to identifying a trigger condition that is pre-identified to cause the electronic device to implement freeze frame presentation functions for the first participant device and present, to the video communication session, the freeze frame video in place of the live video stream of the first participant, temporarily presenting to the video communication session the first freeze frame video of the first participant device in place of the first video feed to represent video content from the first participant device, the first freeze frame video being recorded prior to detection of the pre-identified trigger.

14. The method of claim 13, further comprising:
    receiving, via a communication subsystem of the host electronic device, the first freeze frame video from the first participant device;
    associating the first freeze frame video with the first participant device in a freeze frame mapping resource; and
    retrieving and presenting the first freeze frame video in response to detection of at least one trigger condition from among a group comprising:
      a loss of a video feed signal from the first participant device;
      a noticeable degradation in quality of a presentation of the first video feed;
      detection of a static freeze frame in the first video feed received from the first participant device; and
      detection of a specific condition occurring within the first video feed of the first participant device, the specific condition being one from among a group comprising a facial expression, a gesture, a movement, a local ambient condition, and background activity occurring in a field of view of an image capturing device of the first participant device.

15. The method of claim 13, further comprising:
    receiving notification of an input at the first participant device that turns on contextual freeze frame video functionality of a video communication application of the first participant device;
    in response to receiving the notification, monitoring the first video feed for detection of one or more of a gesture or a facial expression that corresponds to an activation input for initiating a presentation of the first freeze frame video; and
    initiating presenting of the freeze frame video further in response to detection of the activation input.

16. The method of claim 13, further comprising:
    establishing a threshold maximum amount of time for looping the first freeze frame video;
    looping the presentation of the freeze frame video for a period of time until at least one of (i) removal of the trigger condition, (ii) expiration of a threshold maximum amount of time for presentation of the first freeze frame video or (iii) detection of a trigger that re-activates presentation of the first video feed;

monitoring an elapsed time since a start of presenting of the freeze frame video;

transitioning from presenting the freeze frame video as the first video feed to presenting one of a preset video-off image, a blank image template, or the first video feed, in response to the elapsed time reaching the threshold maximum amount of time; and transitioning from presenting the freeze frame video back to the first video feed in response to a second trigger from among a plurality of different triggers associated with presenting the first video feed.

17. The method of claim 13, further comprising:

receiving and buffering the first video feed;

analyzing the first video feed for contextual information that correlates to an action or inaction to be performed by the first participant that requires a current video of the first participant to be temporary removed from being fed to other participants of the video communication session;

determining a video segment of the first video feed to identify as the first freeze frame video, the video segment presenting the first participant as attentive to the video communication session;

selecting a specific freeze frame video start point and determining a length of the video segment, based on the contextual information;

generating the first freeze frame video from the video segment; and storing the first freeze frame video within a server repository.

18. The method of claim 17, wherein generating the first freeze frame video comprises:

transmitting, to the first participant device, at least one prompt that is outputted via an output device of the first participant device, the at least one prompt requesting the first participant to prepare for capturing of local video to use in generating the freeze frame video; and selecting, via an artificial intelligence, a specific sequence of video feed from among a longer sequence of the first video feed, the specific sequence of video feed presenting the first participant being attentive to the video communication session.

19. A computer program product comprising a non-transitory computer readable medium having program instructions that when executed by a processor of an electronic device connected to a display device configures the electronic device to perform functions comprising:

facilitating, via a processor of a host electronic device, a video communication session between a first participant having a first participant device and more than one second participants having second participant devices among a plurality of second participant devices;

receiving, from the first participant device, a first video feed of a first participant to the video communication session;

associating a first freeze frame video with the first participant device in a freeze frame mapping resource, the first freeze frame video being a video segment recorded from the first live video feed and stored within a server repository; and in response to identifying a trigger condition that is pre-identified to cause the electronic device to implement freeze frame presentation functions for the first participant device and present, to the video communication session, the freeze frame video in place of the live video stream of the first participant, temporarily presenting to the video communication session the first freeze frame video of the first participant device in place of the first video feed to represent video content from the first participant device, the first freeze frame video being recorded prior to detection of the pre-identified trigger.

20. The computer program product of claim 19, further comprising:

receiving, via a communication subsystem of the host electronic device, the first freeze frame video from the first participant device;

associating the first freeze frame video with the first participant device in a freeze frame mapping resource; and retrieving and presenting the first freeze frame video in response to detection of at least one trigger condition from among a group comprising:

a loss of a video feed signal from the electronic device;

a noticeable degradation in quality of a presentation of the first video feed;

detection of a static freeze frame in locally captured video feed received from the first participant device; and detection of a specific condition occurring within the first video feed of the first participant device, the specific condition being one from among a group comprising a facial expression, a gesture, a movement, a local ambient condition, and background activity occurring in a field of view of an image capturing device of the first participant device, the detection of the specific condition comprising:

receiving notification of an input at the first participant device that turns on contextual freeze frame video functionality of a video communication application of the first participant device;

in response to receiving the notification, monitoring the first video feed for detection of one or more of a gesture or a facial expression that corresponds to an activation input for initiating a presentation of the first freeze frame video; and initiating the presenting of the freeze frame video in response to detection of the activation input.

* * * * *